United States Patent
Sakai et al.

(10) Patent No.: US 10,678,087 B2
(45) Date of Patent: Jun. 9, 2020

(54) LIQUID CRYSTAL DISPLAY PANEL AND LIQUID CRYSTAL DISPLAY DEVICE

(71) Applicant: SHARP KABUSHIKI KAISHA, Sakai, Osaka (JP)

(72) Inventors: Akira Sakai, Sakai (JP); Yuichi Kawahira, Sakai (JP); Koji Murata, Sakai (JP); Masahiro Hasegawa, Sakai (JP); Takako Koide, Sakai (JP); Kozo Nakamura, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/486,726

(22) PCT Filed: Feb. 14, 2018

(86) PCT No.: PCT/JP2018/004953
§ 371 (c)(1),
(2) Date: Aug. 16, 2019

(87) PCT Pub. No.: WO2018/155262
PCT Pub. Date: Aug. 30, 2018

(65) Prior Publication Data
US 2019/0384101 A1 Dec. 19, 2019

(30) Foreign Application Priority Data
Feb. 21, 2017 (JP) .................. 2017-030172

(51) Int. Cl.
*G02F 1/1335* (2006.01)
*G02F 1/13363* (2006.01)
*G02F 1/1339* (2006.01)

(52) U.S. Cl.
CPC ...... *G02F 1/133514* (2013.01); *G02F 1/1339* (2013.01); *G02F 1/13363* (2013.01);
(Continued)

(58) Field of Classification Search
None
See application file for complete search history.

(56) References Cited

U.S. PATENT DOCUMENTS

2005/0142464 A1* 6/2005 Moriya ................ G02B 5/201
430/7
2006/0262256 A1* 11/2006 Kim ................ G02F 1/133555
349/114

(Continued)

FOREIGN PATENT DOCUMENTS

JP 2012-173672 A 9/2012

*Primary Examiner* — Ryan Crockett
(74) *Attorney, Agent, or Firm* — ScienBiziP, P.C.

(57) ABSTRACT

A liquid crystal display panel includes a first λ/4 retardation layer, a first substrate, a color filter layer, a liquid crystal layer containing horizontally aligned liquid crystals, and a second λ/4 retardation layer that is formed from a different material from the first λ/4 retardation layer between the first substrate and the color filter layer or between the color filter layer and the liquid crystal layer. The second λ/4 retardation layer has a smaller thickness in a region overlapping the blue color filter than in a region overlapping the green color filter. The first λ/4 retardation layer provides a retardation Rout(λ) to light having a wavelength of λ nm. The second λ/4 retardation layer provides a retardation Rin(λ). The retardation Rout(λ) and the retardation Rin(λ) satisfy the following formula (1) in the region overlapping the blue color filter.

$-1.0 \text{ nm} < Rin(450) - Rout(450) < 10.0 \text{ nm}$ (1)

11 Claims, 34 Drawing Sheets

(52) U.S. Cl.
CPC ............... *G02F 1/133512* (2013.01); *G02F 2001/13398* (2013.01); *G02F 2001/133638* (2013.01)

(56) References Cited

U.S. PATENT DOCUMENTS

| | | | |
|---|---|---|---|
| 2008/0158488 A1* | 7/2008 | Yanai | G02F 1/133371 349/107 |
| 2011/0261296 A1* | 10/2011 | Park | G02F 1/133502 349/96 |
| 2012/0218497 A1* | 8/2012 | Kajita | G02F 1/134363 349/98 |
| 2016/0154159 A1* | 6/2016 | Kim | G02B 5/3083 359/489.07 |

\* cited by examiner

LIQUID CRYSTAL DISPLAY PANEL AND LIQUID CRYSTAL DISPLAY DEVICE

TECHNICAL FIELD

The present invention relates to liquid crystal display panels and liquid crystal display devices. More specifically, the present invention relates to a horizontal electric field mode liquid crystal display panel and a liquid crystal display device including the liquid crystal display panel.

BACKGROUND ART

Widely used driving modes for liquid crystals include horizontal electric field modes such as the in-plane switching (IPS) mode and the fringe field switching (FFS) mode. Liquid crystal display panels are widely used in various applications including televisions, laptop computers, tablet computers, smartphones, and car navigation systems, and may be used in an environment with strong external light such as an outdoor environment. For such applications, IPS mode liquid crystal display devices have been suggested which can reduce external light reflection, decrease the light transmittance during the black display, and provide a favorable image quality both in indoors and outdoors (e.g., Patent Literature 1).

CITATION LIST

Patent Literature

Patent Literature 1: JP 2012-173672 A

SUMMARY OF INVENTION

Technical Problem

A conventional liquid crystal display panel, however, may have a low contrast ratio after a heat resistance test. The present inventors made various studies on the cause of this low contrast ratio, and found that the retarder used to reduce the internal reflection of the liquid crystal display panel deteriorated and thereby the luminance during the black display increased. The inventors therefore experimentally used a highly durable retarder, and found that reducing the internal reflection throughout the visible light wavelength range was difficult and the screen was colored during the black display.

In response to the above problem, an object of the present invention is to provide a horizontal electric field mode liquid crystal display panel achieving reduced internal reflection and favorable black display without coloring, and a liquid crystal display device including the liquid crystal display panel.

Solution to Problem

The present inventors examined how to reduce the internal reflection of a horizontal electric field mode liquid crystal display panel, and focused on a technique of providing a pair of $\lambda/4$ retardation layers whose in-plane slow axes are perpendicular to each other. This technique enabled the panel to reduce the internal reflection owing to the effect of a circularly polarizing plate while maintaining the state optically equivalent to conventional horizontal electric field mode liquid crystal display panels. The inventors then revealed that even when the $\lambda/4$ retardation layers are formed from different materials for a purpose such as increasing the durability, favorable black display without coloring can be achieved by modifying the $\lambda/4$ retardation layer disposed on the liquid crystal layer side of the viewing surface side substrate to have a smaller thickness in the regions overlapping the blue color filters than in the regions overlapping the green color filters. Also, favorable black display without coloring can be achieved by modifying the $\lambda/4$ retardation layer to have a greater thickness in the regions overlapping the red color filters than in the regions overlapping the green color filters. Thereby, the inventors successfully solved the above problem, completing the present invention.

In other words, an aspect of the present invention is directed to a liquid crystal display panel (hereinafter, also referred to as a "first liquid crystal display panel") including, sequentially from a viewing surface side to a back surface side: a first linearly polarizing plate; a first $\lambda/4$ retardation layer whose in-plane slow axis extends in a first direction; a first substrate; a color filter layer including a red color filter, a green color filter, and a blue color filter arranged in a plane; a liquid crystal layer containing liquid crystals horizontally aligned with no voltage applied; a pair of electrodes configured to generate a horizontal electric field in the liquid crystal layer upon voltage application; a second substrate; a second linearly polarizing plate; and a second $\lambda/4$ retardation layer that is formed from a different material from the first $\lambda/4$ retardation layer and whose in-plane slow axis extends in a second direction perpendicular to the first direction, the second $\lambda/4$ retardation layer being disposed between the first substrate and the color filter layer or between the color filter layer and the liquid crystal layer, the second $\lambda/4$ retardation layer having a smaller thickness in a region overlapping the blue color filter than in a region overlapping the green color filter, the first $\lambda/4$ retardation layer providing a retardation $Rout(A)$ to light having a wavelength of $\lambda$ nm, the second $\lambda/4$ retardation layer providing a retardation $Rin(\lambda)$ to light having a wavelength of $\lambda$ nm, the retardation $Rout(\lambda)$ and the retardation $Rin(\lambda)$ satisfying the following formula (1) in the region overlapping the blue color filter, $$-1.0\ \text{nm} < Rin(450) - Rout(450) < 10.0\ \text{nm} \qquad (1).$$

Another aspect of the present invention is directed to a liquid crystal display panel (hereinafter, also referred to as a "second liquid crystal display panel") including, sequentially from a viewing surface side to a back surface side: a first linearly polarizing plate; a first $\lambda/4$ retardation layer whose in-plane slow axis extends in a first direction; a first substrate; a color filter layer including a red color filter, a green color filter, and a blue color filter arranged in a plane; a liquid crystal layer containing liquid crystals horizontally aligned with no voltage applied; a pair of electrodes configured to generate a horizontal electric field in the liquid crystal layer upon voltage application; a second substrate; a second linearly polarizing plate; and a second $\lambda/4$ retardation layer that is formed from a different material from the first $\lambda/4$ retardation layer and whose in-plane slow axis extends in a second direction perpendicular to the first direction, the second $\lambda/4$ retardation layer being disposed between the first substrate and the color filter layer or between the color filter layer and the liquid crystal layer, the second $\lambda/4$ retardation layer having a greater thickness in a region overlapping the red color filter than in a region overlapping the green color filter, the first $\lambda/4$ retardation layer providing a retardation $Rout(\lambda)$ to light having a wavelength of $\lambda$ nm, the second $\lambda/4$ retardation layer providing a retardation Rin(λ) to light having a wavelength of λ nm, the retardation Rout(λ) and the retardation Rin(λ) satisfying the following formula (2) in the region overlapping the red color filter, −3.0 nm<Rin(650)−Rout(650)<1.0 nm  (2).

Yet another aspect of the present invention is directed to a liquid crystal display device including the first liquid crystal display panel or the second liquid crystal display panel.

Advantageous Effects of Invention

The present invention can provide a horizontal electric field mode liquid crystal display panel achieving reduced internal reflection and favorable black display without coloring, and a liquid crystal display device including the liquid crystal display panel.

DESCRIPTION OF EMBODIMENTS

Figure 1:
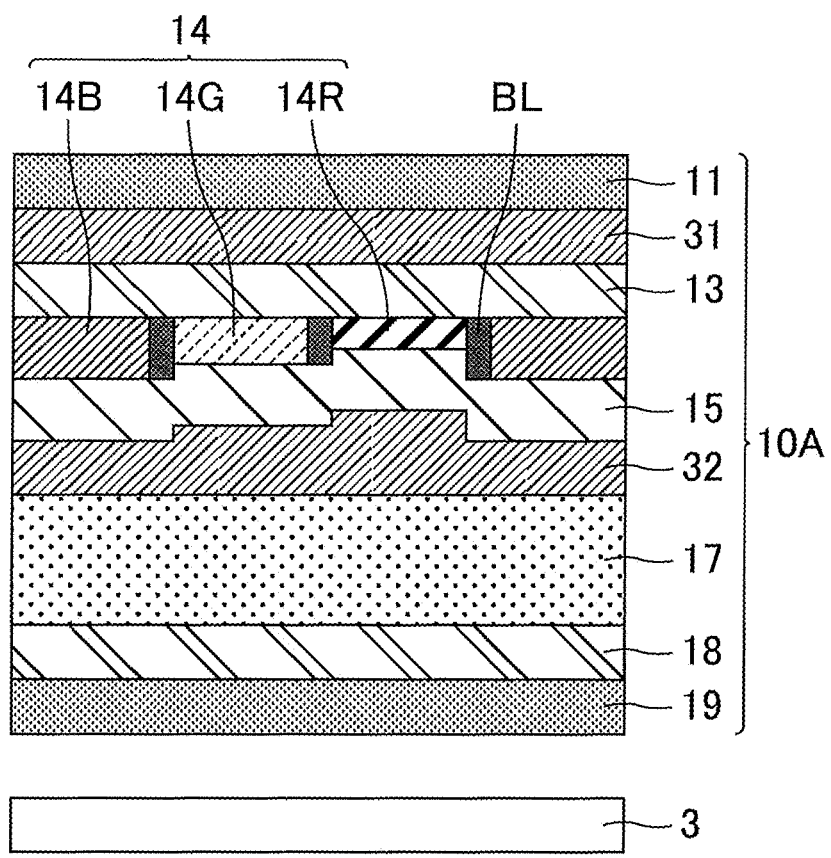
FIG. 1 is a schematic cross-sectional view showing a liquid crystal display device of Embodiment 1.

The present invention is described in more detail based on the following embodiments with reference to the drawings. The embodiments, however, are not intended to limit the scope of the present invention. The configurations of the embodiments may appropriately be combined or modified within the spirit of the present invention.

Herein, the "viewing surface side" means the side closer to the screen (display surface) of the liquid crystal display device, and the "back surface side" means the side farther from the screen (display surface) of the liquid crystal display device.

Herein, the "λ/4 retardation layer" means a retardation layer providing an in-plane retardation of a quarter of a wavelength to at least light having a wavelength of 550 nm, and may be any retardation layer providing an in-plane retardation of 100 nm or more and 176 nm or less. Light having a wavelength of 550 nm is light of a wavelength at which a human has the highest visual sensitivity. The in-plane retardation is defined as $R=(ns-nf) \times d$, where ns represents the in-plane principal refractive index nx or ny of the retardation layer, whichever is greater, and nf represents the in-plane principal refractive index nx or ny of the retardation layer, whichever is smaller. The principal refractive index means a value relative to light having a wavelength of 550 nm, unless otherwise specified. The in-plane slow axis of a retardation layer means an axis extending in the direction corresponding to ns, and the in-plane fast axis thereof means an axis extending in the direction corresponding to nf. The symbol d represents the thickness of the retardation layer. Herein, the "retardation" means an in-plane retardation, unless otherwise specified.

Herein, red (R), green (G), and blue (B) are defined as follows. "Red" is a color whose dominant wavelength is 600 nm or longer and 780 nm or shorter, preferably 620 nm or longer and 750 nm or shorter. "Green" is a color whose dominant wavelength is 500 nm or longer and 600 nm or shorter, preferably 500 nm or longer and 570 nm or shorter. "Blue" is a color whose dominant wavelength is 380 nm or longer and 500 nm or shorter, preferably 450 nm or longer and 495 nm or shorter. The color of a color filter layer is determined based on the dominant wavelength measured using a typical liquid crystal display LED backlight having the emission spectrum shown in FIG. 9 as a light source.

Herein, the state where two axes (directions) are perpendicular to each other means that they form an angle (absolute value) falling in the range of 90°±3°, preferably 90°±1°, more preferably 90°±0.5°, particularly preferably an angle of 90° (perfectly perpendicular to each other).

Herein, the state where two axes (directions) form an angle of 45° means that they form an angle (absolute value) falling in the range of 45°±3°, preferably 45°±1°, more preferably 45°±0.5°, particularly preferably an angle of 45° (perfect 45°).

Herein, "R(λ)" means a retardation value (unit: nm) provided to light having a wavelength of λ nm, and "Tλ" means a transmittance (unit: %) of light having a wavelength of λ nm.

Embodiment 1

FIG. 1 is a schematic cross-sectional view showing a liquid crystal display device of Embodiment 1. As shown in FIG. 1, a liquid crystal display device of Embodiment 1 includes a backlight 3 and a liquid crystal display panel 10A. The backlight 3 is on the back surface side and the liquid crystal display panel 10A is on the viewing surface side. Light is emitted from the backlight 3, and the amount of the light to be transmitted through the liquid crystal display panel 10A is controlled by the voltage applied to a liquid crystal layer 17 in the liquid crystal display panel 10A.

The backlight 3 may be any backlight such as an edge-lit backlight or a direct-lit backlight. The light source of the backlight 3 may be any light source such as a light emitting diode (LED) or a cold cathode fluorescent lamp (CCFL).

The liquid crystal display panel 10A sequentially includes, from the viewing surface side to the back surface side, a first linearly polarizing plate 11, a first λ/4 retardation layer 31, a first substrate 13, a color filter layer 14 and a black matrix BL, an overcoat layer 15, a second λ/4 retardation layer 32, a liquid crystal layer 17, a second substrate 18, and a second linearly polarizing plate 19. The liquid crystal display panel 10A may include other components. For example, disposing an antireflective film on the viewing surface side of the first linearly polarizing plate 11 can further decrease the reflectance of the liquid crystal display panel 10A. A suitable antireflective film is a moth-eye film having a surface structure resembling a moth's eye.

The first linearly polarizing plate 11 and the second linearly polarizing plate 19 can each be, for example, a polarizer (absorptive polarizing plate) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The transmission axis of the first linearly polarizing plate 11 and the transmission axis of the second linearly polarizing plate 19 are preferably perpendicular to each other. In this structure, the first linearly polarizing plate 11 and the second linearly polarizing plate 19 are disposed in crossed Nicols, so that a favorable black display state can be achieved with no voltage applied. In the following description, the transmission axis of the first linearly polarizing plate 11 is defined as being at an azimuth of 0°. Here, the transmission axis of the second linearly polarizing plate 19 is preferably at an azimuth of 90°.

The first substrate 13 and the second substrate 18 may each be a glass substrate or a plastic substrate, for example. On the liquid crystal layer 17 side of the second substrate 18 is disposed a pair of electrodes configured to generate a horizontal electric field in the liquid crystal layer 17 when voltage is applied. The liquid crystal driving mode of the liquid crystal display device of the present embodiment may be, for example, the fringe field switching (FFS) mode or the in-plane-switching (IPS) mode. The following shows an exemplary case where the second substrate 18 is an FFS mode thin-film transistor array substrate with reference to FIG. 2.

Figure 2:
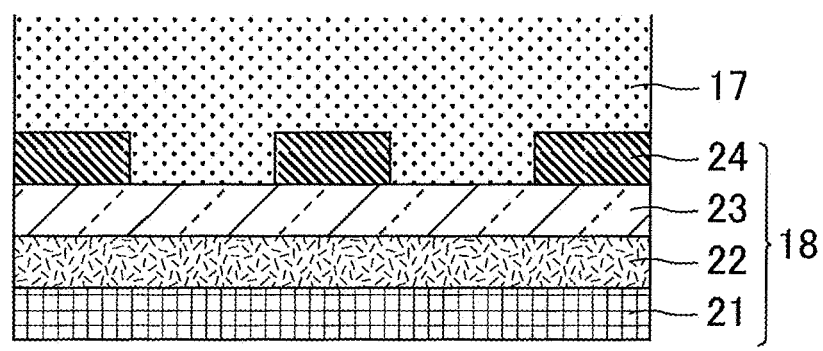
FIG. 2 is a schematic cross-sectional view showing an exemplary structure of a second substrate.

FIG. 2 is a schematic cross-sectional view showing an exemplary structure of a second substrate. As shown in FIG. 2, the second substrate 18 includes a supporting substrate 21, a common electrode (planar electrode) 22 disposed on the liquid crystal layer 17 side surface of the supporting substrate 21, an insulating film 23 covering the common electrode 22, and pixel electrodes (comb electrodes) 24 disposed on the liquid crystal layer 17 side surface of the insulating film 23. This structure can generate horizontal electric fields (fringe electric fields) in the liquid crystal layer 17 by applying voltage between the common electrode 22 and the pixel electrodes 24 constituting the pair of electrodes. Thereby, the alignment of the liquid crystals in the liquid crystal layer 17 can be controlled by adjusting the voltage to be applied between the common electrode 22 and the pixel electrodes 24.

The supporting substrate 21 can be, for example, a glass substrate or a plastic substrate. The common electrode 22 and the pixel electrodes 24 can be formed from, for example, indium tin oxide (ITO) or indium zinc oxide (IZO). The insulating film 23 is formed from, for example, an organic insulating film or a nitride film.

The second substrate 18 includes a horizontal alignment film (not shown) covering the pixel electrodes 24. The horizontal alignment film can be one formed by a known method.

Hereinabove, the case was shown where the second substrate 18 was an FFS mode thin-film transistor array substrate. An IPS mode thin-film transistor array substrate, which is also in the horizontal electric field mode, can control the alignment of the liquid crystals in the liquid crystal layer 17 by applying voltage to the pair of comb electrodes to generate a horizontal electric field in the liquid crystal layer 17.

The color filter layer 14 has a structure in which red color filters 14R, green color filters 14G, and blue color filters 14B are disposed in the plane. The red color filters 14R, the green color filters 14G, and the blue color filters 14B are partitioned by the black matrix BL. The red color filters 14R, the green color filters 14G, the blue color filters 14B, and the black matrix BL are formed from, for example, a transparent resin containing a pigment. Typically, a group of a red color filter 14R, a green color filter 14G, and a blue color filter 14B is disposed in each pixel. The liquid crystal display panel achieves the desired color in each pixel by mixing colored lights obtained through the red color filter 14R, the green color filter 14G, and the blue color filter 14B while controlling the amounts of colored lights.

The overcoat layer 15 covers the liquid crystal layer 17 side surface of the color filter layer 14. The overcoat layer 15 can prevent impurities in the color filter layer 14 from dissolving into the liquid crystal layer 17. The overcoat layer 15 is preferably formed from a transparent resin.

The liquid crystal layer 17 contains liquid crystals that are horizontally aligned with no voltage applied. On the respective surfaces between which the liquid crystal layer 17 is held are disposed horizontal alignment films (not shown) that control the alignment of the liquid crystals. The liquid crystals in the liquid crystal layer 17 are horizontally aligned by the controlling force provided by the horizontal alignment films when no voltage is applied between the electrodes on the second substrate 18 side (with no voltage applied). The liquid crystals are rotated in the in-plane direction according to the horizontal electric fields generated in the liquid crystal layer 17 when voltage is applied between the electrodes (with voltage applied).

The liquid crystal display device of the present embodiment includes the combination of the first λ/4 retardation layer 31 and the second λ/4 retardation layer 32. The first λ/4 retardation layer 31 is referred to also as an "out-cell λ/4 plate" as it is disposed farther from the liquid crystal layer 17 (closer to the viewing surface side) than the first substrate 13 and a λ/4 retardation layer is typically abbreviated to a λ/4 plate. The second λ/4 retardation layer 32 is referred to also as an "in-cell λ/4 plate" as it is disposed closer to the liquid crystal layer 17 (closer to the back surface side) than the first substrate 13 and a λ/4 retardation layer is typically abbreviated to a λ/4 plate.

In the conventional FFS mode, the viewing surface side polarizing plate consists of the first linearly polarizing plate 11. In the present embodiment, the viewing surface side polarizing plate consists of the first linearly polarizing plate 11 and the out-cell λ/4 plate 31 and functions as a circularly polarizing plate as a whole. This can prevent the internal reflection of the liquid crystal display panel 10A (color filter substrate, to be exact).

A circularly polarizing FFS mode liquid crystal display panel obtained by combining only the out-cell λ/4 plate 31 into the conventional FFS mode liquid crystal display panel cannot provide the black display. The liquid crystal display device of the present embodiment therefore further includes the in-cell λ/4 plate 32 to enhance the performance of the circularly polarizing FFS mode liquid crystal display panel. In other words, the color filter substrate sandwiched between two λ/4 plates perpendicular to each other enables the black display based on the same optical principle as a conventional FFS mode liquid crystal display panel using the illumination light from the backlight 3 while reducing the external light reflection by the color filter substrate.

In order to achieve the above effect, the axial arrangement and the retardation values of the out-cell λ/4 plate 31 and the in-cell λ/4 plate 32 are designed such that they cancel out each other's retardation. The out-cell λ/4 plate 31 has an in-plane slow axis in a first direction. The in-cell λ/4 plate 32 has an in-plane slow axis in a second direction perpendicular to the first direction. In other words, the in-plane slow axis of the out-cell λ/4 plate 31 and the in-plane slow axis of the in-cell λ/4 plate 32 are perpendicular to each other. This axial arrangement allows the out-cell λ/4 plate 31 and the in-cell λ/4 plate 32 to cancel out each other's retardation provided to light incident from the direction normal to the liquid crystal display panel 10A, so that the plates are optically substantially absent. In other words, a structure can be achieved which is optically equivalent to conventional horizontal electric field mode liquid crystal display panels in terms of light emitted from the backlight 3 and incident on the liquid crystal display panel 10A. Thereby, the horizontal electric field mode display can be achieved using the circularly polarizing plate.

The first direction and the second direction preferably form an angle of 45° with the transmission axis of the first linearly polarizing plate 11 and the transmission axis of the second linearly polarizing plate 19, respectively, for achievement of the functions of the retardation layers. In other words, preferably, one of the first direction and the second direction is at an azimuth of 45° and the other is at an azimuth of 135°. For example, preferably, the first direction is at an azimuth of 45° and the second direction is at an azimuth of 135°.

In a preferred optical axis arrangement in the present embodiment, for example, with the azimuth of the transmission axis of the first linearly polarizing plate 11 being defined as 0°, the azimuth of the in-plane slow axis of the out-cell λ/4 plate 31 is 45°, the azimuth of the in-plane slow axis of the in-cell λ/4 plate 32 is 135°, the initial alignment azimuth of the liquid crystals in the liquid crystal layer 17 is 0° or 90°, and the azimuth of the transmission axis of the second linearly polarizing plate 19 is 90°.

The in-cell λ/4 plate 32 and the out-cell λ/4 plate 31 are formed from different materials. In a typical method for producing the liquid crystal display panel 10A, the color filter layer 14, the overcoat layer 15, and the in-cell λ/4 plate 32 are sequentially formed on one surface of the first substrate 13. Herein, the stack of the first substrate 13, the color filter layer 14, and the overcoat layer 15 is referred to as a "color filter substrate". The first linearly polarizing plate 11 and the out-cell λ/4 plate 31 are bonded to the other surface of the first substrate 13 in the color filter substrate. As described above, since the in-cell λ/4 plate 32 and the out-cell λ/4 plate 31 are typically formed through different production processes, forming the in-cell λ/4 plate 32 and the out-cell λ/4 plate 31 from different materials is advantageous in terms of reliability and productivity.

Meanwhile, forming the in-cell λ/4 plate 32 and the out-cell λ/4 plate 31 from different materials raises a problem that the wavelength dispersibilities of the in-cell λ/4 plate 32 and the out-cell λ/4 plate 31 are different. In other words, in order to impart the same wavelength dispersibility to the in-cell λ/4 plate 32 and the out-cell λ/4 plate 31, the in-cell λ/4 plate 32 and the out-cell λ/4 plate 31 are typically formed from the same materials.

The "wavelength dispersibility of a retardation layer" as used herein means the correlation between the magnitude of the retardation provided by the retardation layer and the wavelength of the incident light. In the visible light range, a retardation layer may have a "flat wavelength dispersion" property where the magnitude of the retardation provided by the retardation layer does not change in response to a change in the wavelength of incident light. Also, in the visible light range, the retardation layer may have a "normal wavelength dispersion" property where the magnitude of the retardation provided by the retardation layer decreases as the wavelength of incident light becomes longer. The retardation provided by the retardation layer is calculated as a product of the birefringence Δn and the thickness d of the retardation layer.

Herein, a material having a birefringence Δn(λ) for light having a wavelength of λ nm and satisfying the following formulas (3) and (4) is referred to as a "flat wavelength dispersion material".

$$0.99 < \Delta n(450\ nm)/\Delta n(550\ nm) < 1.03 \qquad (3)$$

$$0.98 < \Delta n(650\ nm)/\Delta n(550\ nm) < 1.01 \qquad (4)$$

Herein, a material having a birefringence Δn(λ) for light having a wavelength of λ nm, a ratio Δn(450 nm)/Δn(550 nm) of 1.03 or higher, and a ratio Δn(650 nm)/Δn(550 nm) of 0.98 or lower is referred to as a "normal wavelength dispersion material".

As described above, since the out-cell λ/4 plate 31 and the in-cell λ/4 plate 32 cancel out each other's retardation, light leakage occurs during the black display unless the retardation values of the two λ/4 plates 31 and 32 match exactly. Different wavelength dispersibilities result in different degrees of matching of the retardation values at different wavelengths of incident light, unfortunately causing coloring of the light.

The out-cell λ/4 plate 31 may be formed from any material, and is preferably a stretched polymer film typically used in the field of liquid crystal display devices as the out-cell λ/4 plate 31 can be formed on the color filter substrate by bonding. The polymer film can be formed from, for example, a cycloolefin polymer, polycarbonate, polysulfone, polyether sulfone, polyethylene terephthalate, polyethylene, polyvinyl alcohol, norbornene, triacetyl cellulose, or diacetyl cellulose, preferably from a cycloolefin polymer. A retardation layer formed from a cycloolefin polymer has advantages of excellent durability and a small change in retardation after long-term exposure to a high temperature environment or a high temperature, high humidity environment. Known examples of a film of a cycloolefin polymer include "ZEONOR® film" from Zeon Corporation and "ARTON® film" from JSR Corporation.

The in-cell λ/4 plate 32 can be formed from any material, and is preferably formed from a cured product of a reactive liquid crystal polymer (also referred to as "reactive mesogen"). The reactive liquid crystal polymer enables formation of the in-cell λ/4 plate 32 by coating during the production process of the color filter substrate, giving a small thickness to the liquid crystal display panel 10A.

The reactive liquid crystal polymer is preferably a liquid crystalline polymer having a photoreactive group. Examples of the liquid crystalline polymer having a photoreactive group include polymers having a substituent (mesogen group) such as a biphenyl group, a terphenyl group, a naphthalene group, a phenyl benzoate group, an azobenzene group, or a derivative thereof, and a photoreactive group such as a cinnamoyl group, a chalcone group, a cinnamylidene group, a β-(2-phenyl)acryloyl group, a cinnamic acid group, or a derivative thereof together in side chain(s), and a structure derived from a compound such as acrylate, methacrylate, maleimide, N-phenyl maleimide, or siloxane in the main chain. The polymer may be a homopolymer containing only a single type of repeat unit, or may be a copolymer containing two or more types of repeat units with different side chain structures. The "copolymer" includes copolymers such as alternating copolymers, random copolymers, and graft copolymers. In each copolymer, a side chain of at least one repeat unit has the mesogen group and the photoreactive group together, but a side chain of another repeat unit may contain no mesogen group or no photoreactive group.

Examples of the solvent used for coating with the reactive liquid crystal polymer include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, and dimethylacetamide. These may be used alone or in combination with each other.

The retardation layer can be formed from the reactive liquid crystal polymer specifically by the following method. First, a base alignment film is formed on a color filter substrate and subjected to an alignment treatment such as rubbing or photoirradiation, so that the alignment azimuth is fixed. The base alignment film having been subjected to the alignment treatment is coated with a reactive liquid crystal polymer, which is then cured by a method such as baking or photoirradiation. The cured reactive liquid crystal polymer molecules are aligned at the alignment azimuth of the base alignment film, and thus the film functions as a retardation layer. The retardation provided by the retardation layer is determined as a product of the birefringence Δn of the reactive liquid crystal polymer and the thickness d of the retardation layer. The retardation layer may be formed on the color filter substrate by placing a transfer film with a layer of a cured product of a reactive liquid crystal polymer on a base film such as a PET film, and transferring the layer of the cured product of the reactive liquid crystal polymer onto the color filter substrate.

The out-cell λ/4 plate 31 can also be formed from the reactive liquid crystal polymer. The out-cell λ/4 plate 31 can be formed from the reactive liquid crystal polymer by coating a flat base film such as a PET film with a material to form a film, transferring the obtained film onto a linearly polarizing plate or a liquid crystal display panel with an adhesive in between, and removing the base film, or by coating the outer side (viewing side surface) of a color filter substrate with the material directly to form a film. Also, the in-cell λ/4 plate 32 can be formed using a stretched polymer film.

The wavelength dispersibility obtained with the birefringence Δn of the reactive liquid crystal polymer suitable for the in-cell λ/4 plate 32 is a normal wavelength dispersion. Thus, in order to cancel out the retardation provided by the in-cell λ/4 plate 32 formed from the reactive liquid crystal polymer with precision at every wavelength and achieve favorable black display, a normal wavelength dispersion material is usually used for the out-cell λ/4 plate 31, and a reactive liquid crystal polymer may be used as in the case of the in-cell λ/4 plate 32. However, an out-cell λ/4 plate 31 formed from a reactive liquid crystal polymer was found to have lower heat resistance than the in-cell λ/4 plate 32 formed from the same reactive liquid crystal polymer and tend to have a low magnitude of retardation in high temperature environments. For example, when the liquid crystal display panel was stored at 80° C. for 500 hours, the magnitude of retardation provided by the out-cell λ/4 plate 31 decreased by about 3% whereas the magnitude of retardation provided by the in-cell λ/4 plate 32 remained the same. This is presumably because the in-cell λ/4 plate 32 formed during the production process of the liquid crystal display panel has undergone high-temperature processes such as formation of photo spacers (PS) to maintain the cell thickness and baking of the alignment films before the out-cell λ/4 plate 31 is bonded, so that the magnitude of retardation provided by the in-cell λ/4 plate 32 does not decrease any more and becomes sufficiently stable during the production process of the liquid crystal display panel. In contrast, the out-cell λ/4 plate 31 is not subjected to such high-temperature processes to prevent problems such as deterioration of the first linearly polarizing plate 11. Thus, in a durability test of the liquid crystal display panel, the magnitude of retardation provided by the out-cell λ/4 plate 31 decreases while the magnitude of retardation provided by the in-cell λ/4 plate 32 remains unchanged. The out-cell λ/4 plate 31 and the in-cell λ/4 plate 32 in the liquid crystal display panel after the test therefore fail to cancel out each other's retardation, causing light leakage.

The light leakage after the durability test can be prevented by forming the out-cell λ/4 plate 31 from a highly durable cycloolefin polymer. Yet, since the cycloolefin polymer is a flat wavelength dispersion material, it is difficult for the out-cell λ/4 plate 31 to cancel out the retardation provided by the in-cell λ/4 plate 32 formed from a normal wavelength dispersion material such as a reactive liquid crystal polymer with precision at every wavelength.

The present embodiment therefore adjusts the thickness of the in-cell λ/4 plate 32 according to the corresponding color of the color filter layer 14 so as to control the wavelength dispersion of the in-cell λ/4 plate 32 to the flat wavelength dispersion. In other words, the in-cell λ/4 plate 32 has a smaller thickness in the regions overlapping the blue color filters 14B than in the regions overlapping the green color filters 14G. Thereby, the retardations provided by the out-cell λ/4 plate 31 providing a retardation Rout(λ) to light having a wavelength of λ nm and the in-cell λ/4 plate 32 providing a retardation Rin(λ) to the light having a wavelength of λ nm are each adjusted to satisfy the following formula (1) in the regions overlapping the blue color filters 14B.

$$-1.0 \text{ nm} < R\text{in}(450) - R\text{out}(450) < 10.0 \text{ nm} \quad (1)$$

With the retardations satisfying the above formula (1), the out-cell λ/4 plate 31 and the in-cell λ/4 plate 32 can cancel out each other's retardation provided to light in the blue wavelength range, which is a short wavelength range. Thereby, light leakage and coloring observed on the display surface of the liquid crystal display device can be reduced in a balanced manner. When light leakage is prevented, the contrast ratio of the liquid crystal display device particularly in a dark use environment can be increased, so that the visibility of the liquid crystal display can be increased and low power consumption (long battery run time) owing to an increase in use efficiency of the backlight illumination can be achieved. When coloring is prevented, the display quality in the display state can be increased and the boundary between the screen and the frame in the non-display state can be made inconspicuous, so that the design (designability) of the liquid crystal display device can be improved. These effects are important in increasing the merchantability of the liquid crystal display device.

The in-cell λ/4 plate 32 has a greater thickness in the regions overlapping the red color filters 14R than in the regions overlapping the green color filters. Thereby, the retardations provided by the out-cell λ/4 plate 31 and the in-cell λ/4 plate 32 are each adjusted to satisfy the following formula (2) in the regions overlapping the red color filters 14R.

$$-3.0 \text{ nm} < R\text{in}(650) - R\text{out}(650) < 1.0 \text{ nm} \quad (2)$$

With the retardations satisfying the above formula (2), the out-cell λ/4 plate 31 and the in-cell λ/4 plate 32 can cancel out each other's retardation provided to light in the red wavelength range, which is a long wavelength range. Thereby, light leakage and coloring observed on the display surface of the liquid crystal display device can be reduced in a balanced manner.

Figure 3:
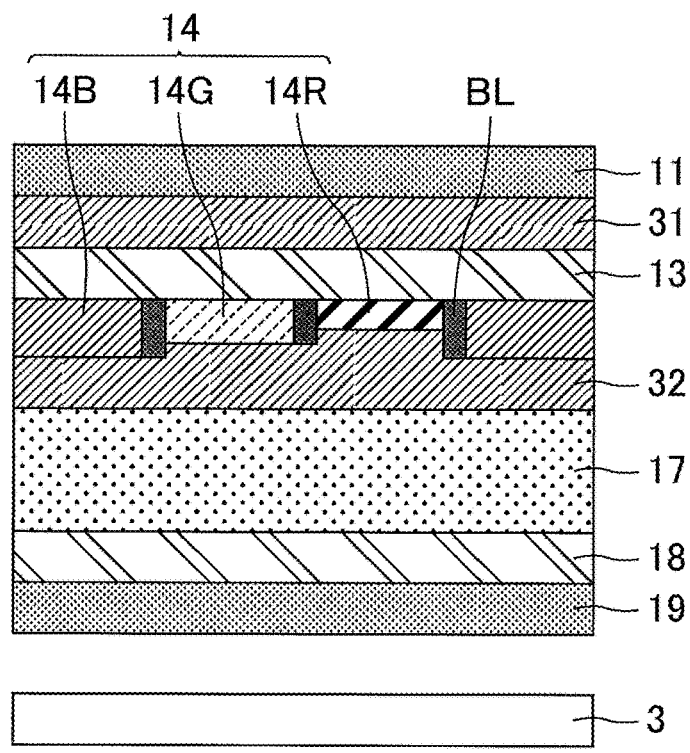
FIG. 3 is a schematic cross-sectional view showing a first modified example of the liquid crystal display device of Embodiment 1.
Figure 4:
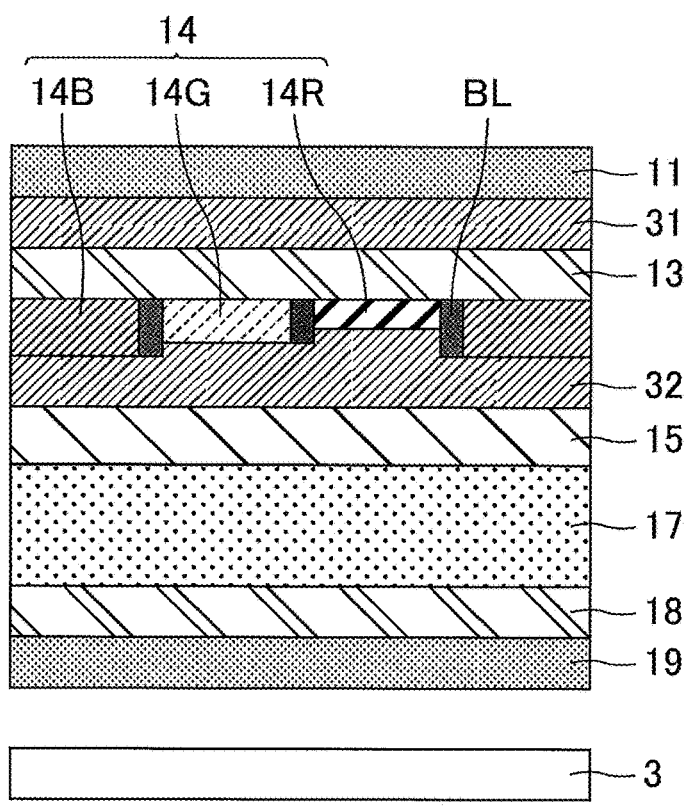
FIG. 4 is a schematic cross-sectional view showing a second modified example of the liquid crystal display device of Embodiment 1.

The thickness of the in-cell λ/4 plate 32 may be adjusted by any method, and a method utilizing thickness difference between colors of the color filter layer 14 is suitable. When the in-cell λ/4 plate 32 is formed by coating a non-flat surface of the color filter substrate with a reactive liquid crystal polymer, the in-cell λ/4 plate 32 having different thicknesses d for different colors can be easily obtained, and the resulting wavelength dispersion is different from the wavelength dispersion of the retardation provided by the in-cell λ/4 plate 32 having a uniform thickness. The magnitude of thickness difference between colors of the color filter layer 14 can be adjusted by the thickness difference between the blue color filters 14B, the green color filters 14G, and the red color filters 14R and the thickness of the overcoat layer 15. With a thinner overcoat layer 15, the surface shape of the color filter layer 14 with different thicknesses between colors can be more easily reflected on the surface shape of the overcoat layer 15. For effective utilization of the thickness difference between colors of the color filter layer 14 for adjustment of the thickness of the in-cell λ/4 plate 32, the in-cell λ/4 plate 32 may be directly disposed on the color filter layer 14 without the overcoat layer 15, or the position of the in-cell λ/4 plate 32 may be changed to between the color filter layer 14 and the overcoat layer 15. FIG. 3 is a schematic cross-sectional view showing a first modified example of the liquid crystal display device of Embodiment 1, showing the structure in which the in-cell λ/4 plate 32 is directly disposed on the color filter layer 14 without the overcoat layer 15. FIG. 4 is a schematic cross-sectional view showing a second modified example of the liquid crystal display device of Embodiment 1, showing the structure in which the in-cell λ/4 plate 32 is disposed between the color filter layer 14 and the overcoat layer 15.

In the case where the in-cell λ/4 plate 32 is formed to have a smaller thickness in the regions overlapping the blue color filters 14B than in the regions overlapping the green color filters 14G, the possible method is to give a greater thickness to the regions of the blue color filters 14B overlapping the in-cell λ/4 plate 32 than to the regions of the green color filters 14G overlapping the in-cell λ/4 plate 32.

In the case where the in-cell λ/4 plate 32 is formed to have a greater thickness in the regions overlapping the red color filters 14R than in the regions overlapping the green color filters, the possible method is to give a smaller thickness to the regions of the red color filters 14R overlapping the in-cell λ/4 plate 32 than to the regions of the green color filters 14G overlapping the in-cell λ/4 plate 32.

Figure 5:
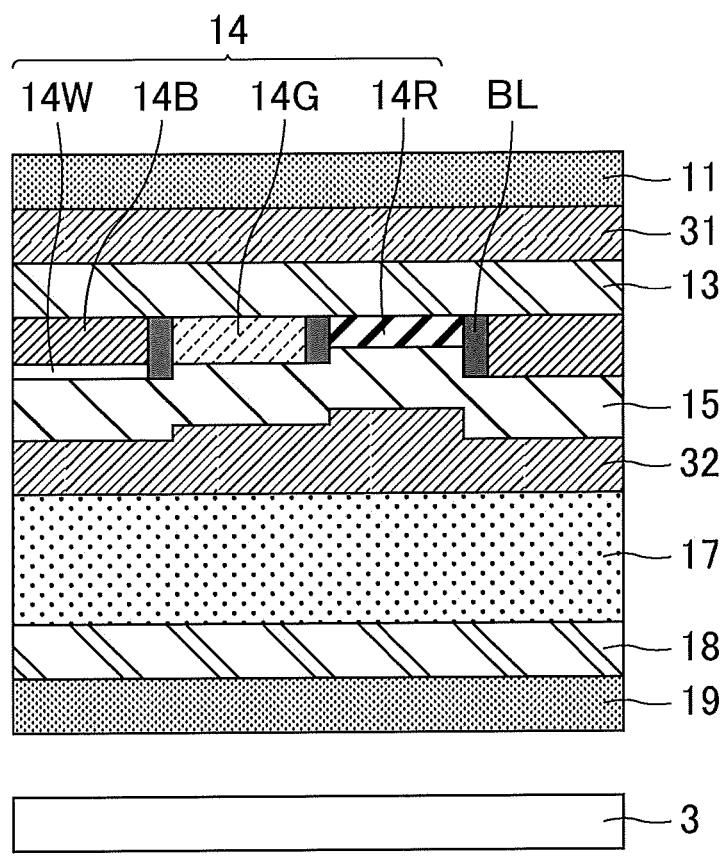
FIG. 5 is a schematic cross-sectional view showing a third modified example of the liquid crystal display device of Embodiment 1.

FIG. 5 is a schematic cross-sectional view showing a third modified example of the liquid crystal display device of Embodiment 1. As shown in FIG. 5, the color filter layer 14 may include colorless spacers (difference-controlling layers)

14W, and the thickness of the color filter layer 14 may be adjusted using the colorless spacers 14W. In the case where the in-cell λ/4 plate 32 is formed to have a smaller thickness in the regions overlapping the blue color filters 14B than in the regions overlapping the green color filters 14G, the colorless spacers 14W may be disposed between the in-cell λ/4 plate 32 and the blue color filters 14B. The colorless spacers 14W are preferably formed from a transparent resin.

Figure 6:
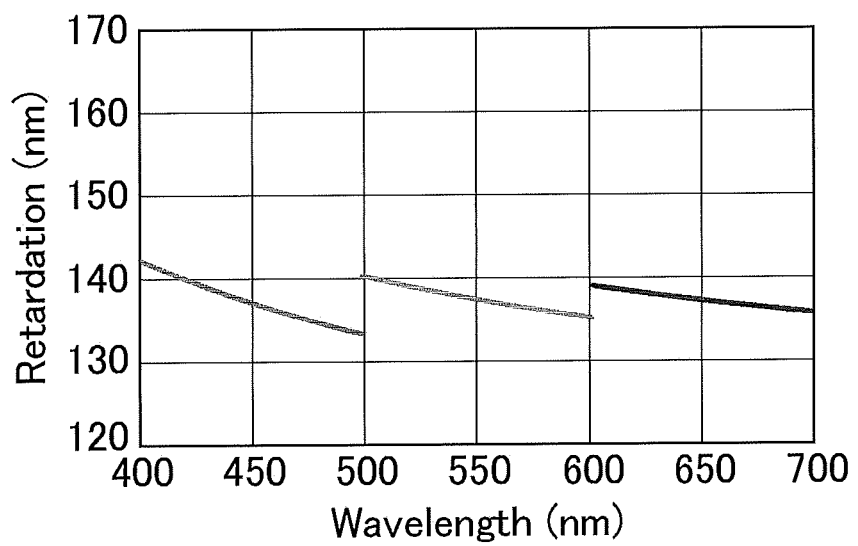
FIG. 6 is a graph showing the wavelength dispersion of an in-cell λ/4 plate 32 in Embodiment 1 that is formed from a normal wavelength dispersion material and whose thickness is adjusted to suit each color.
Figure 7:
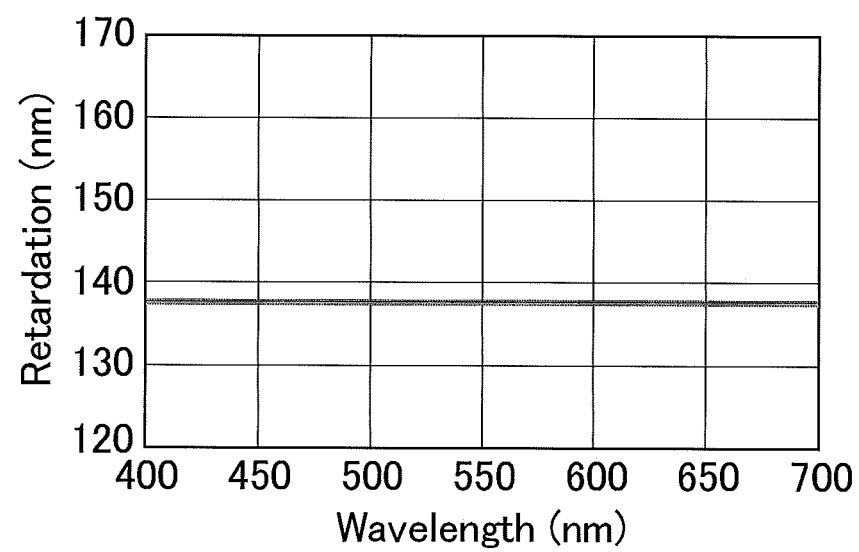
FIG. 7 is a graph showing the wavelength dispersion of an out-cell λ/4 plate 31 in Embodiment 1 that is formed from a flat wavelength dispersion material.
Figure 8:
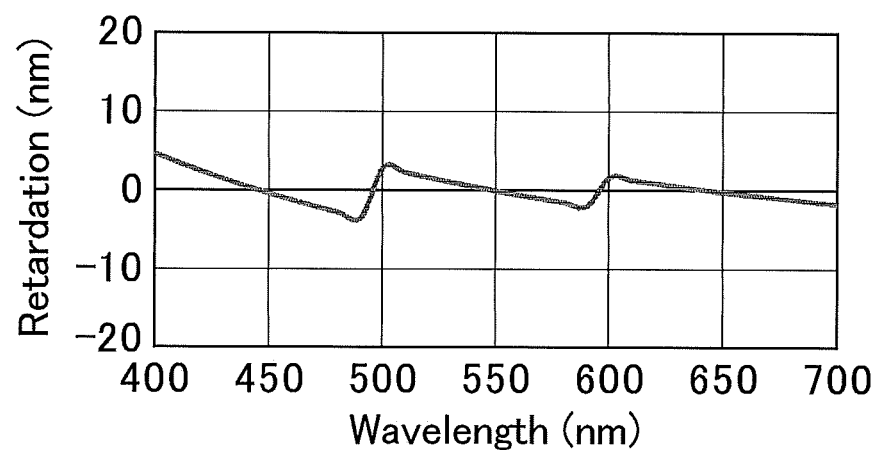
FIG. 8 is a graph showing the difference in retardation between the out-cell λ/4 plate 31 and the in-cell λ/4 plate 32 in Embodiment 1.

Consequently, in the present embodiment, adjusting the thickness of the in-cell λ/4 plate 32 according to the corresponding color of the color filter layer 14 enables formation of the in-cell λ/4 plate 32 having the flat wavelength dispersion property using a normal wavelength dispersion material. FIG. 6 is a graph showing the wavelength dispersion of the in-cell λ/4 plate 32 in the present embodiment that is formed from a normal wavelength dispersion material and whose thickness is adjusted to suit each color. FIG. 7 is a graph showing the wavelength dispersion of the out-cell λ/4 plate 31 in the present embodiment that is formed from a flat wavelength dispersion material. FIG. 8 is a graph showing the difference in retardation between the out-cell λ/4 plate 31 and the in-cell λ/4 plate 32 in the present embodiment. As shown in FIG. 8, the in-cell λ/4 plate 32 in the present embodiment that is formed from a normal wavelength dispersion material and whose thickness is adjusted to suit each color can substantially cancel out the retardation provided by the out-cell λ/4 plate 31 in the present embodiment formed from a flat wavelength dispersion material in a wide range of 400 to 700 nm. Thus, even when the out-cell λ/4 plate 31 is formed from a highly durable flat wavelength dispersion material such as a cycloolefin polymer, the in-cell λ/4 plate 32 can be formed from a normal wavelength dispersion material.

Hereinafter, the design concept of the liquid crystal display panel 10A of the present embodiment is described in detail with reference to the simulation results.

The preferred retardation range provided by the in-cell λ/4 plate 32 in a circularly polarizing FFS mode liquid crystal display panel was calculated and the results were considered. For the calculation, a commercially available liquid crystal simulator ("LCD Master" from Shintech Inc.) was used. The calculation results are also applicable to circularly polarizing IPS mode liquid crystal display panels.

Figure 9:
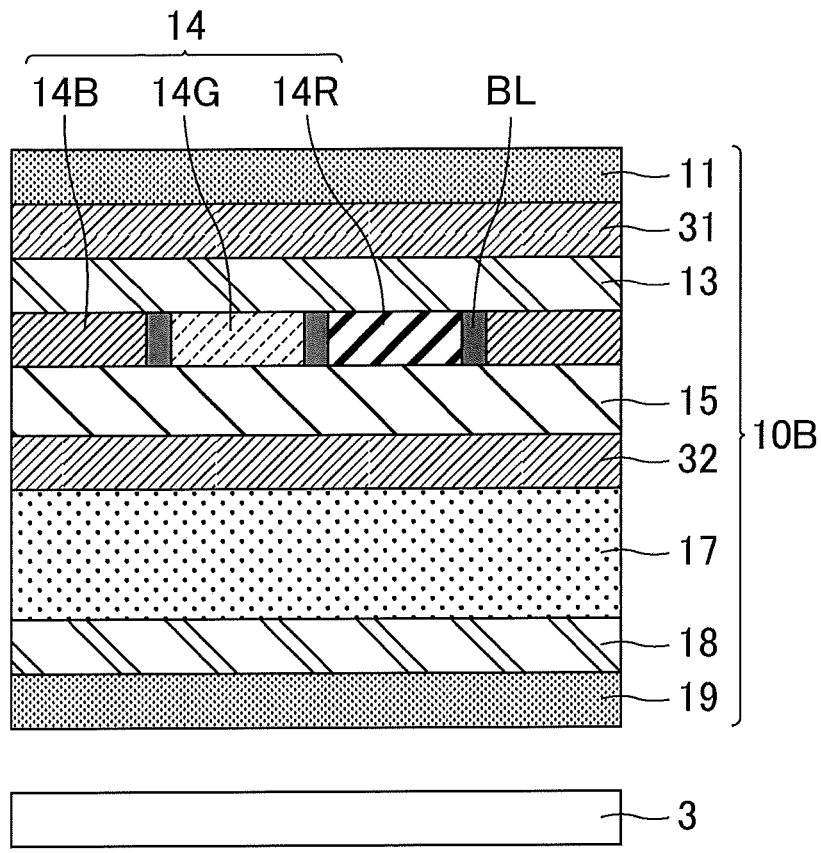
FIG. 9 is a schematic cross-sectional view showing a standard structure of a circularly polarizing FFS mode liquid crystal panel.

The standard structure of the circularly polarizing FFS mode liquid crystal panel is as shown in FIG. 9. The standard circularly polarizing FFS mode liquid crystal panel is different from a conventional common FFS mode liquid crystal display panel in that it includes the out-cell λ/4 plate 31 and the in-cell λ/4 plate 32. The out-cell λ/4 plate 31 and the in-cell λ/4 plate 32 enable the viewer's side polarizing plate to function as a circularly polarizing plate, preventing the internal reflection of the liquid crystal display panel 10B (color filter substrate, to be exact). Also, for elimination of the adverse effect of the out-cell λ/4 plate 31 constituting the circularly polarizing plate that the black display cannot be provided, the in-cell λ/4 plate 32 is disposed to cancel out the retardation provided by the out-cell λ/4 plate 31. In other words, the color filter substrate is sandwiched between two λ/4 plates whose in-plane slow axes are perpendicular to each other. This enables the black display based on the same optical principle as a conventional FFS mode liquid crystal display panel using the illumination light from the backlight while reducing the external light reflection by the color filter substrate. Light leakage occurs during the black display unless the retardation values of the two λ/4 plates match exactly. Different degrees of matching of the retardation values at different wavelengths of incident light unfortunately cause coloring.

The in-cell λ/4 plate 32 is formed by coating with a reactive liquid crystal polymer (reactive mesogen). The wavelength dispersion obtained with the birefringence an of the reactive liquid crystal polymer is the normal wavelength dispersion where the absolute value of the birefringence Δn decreases as the wavelength of incident light becomes longer. Thus, coating a flat color filter substrate to a uniform thickness gives normal wavelength dispersion to the retardation.

In order to cancel out the retardation provided by the in-cell λ/4 plate 32 with precision at every wavelength to achieve favorable black display, the out-cell λ/4 plate 31 is typically formed from a normal wavelength dispersion material. This can be achieved by using a reactive liquid crystal material as in the case of the in-cell λ/4 plate 32. The black display state achieved by this standard structure was simulated using a simulator.

The parameters used in the simulations are as follows.

Figure 10:
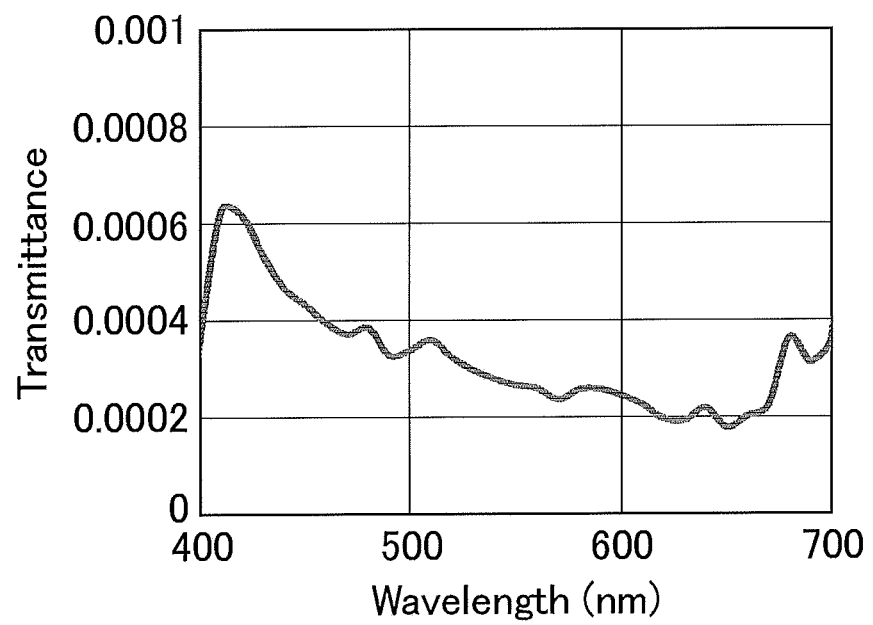
FIG. 10 is a graph showing the transmission spectrum of crossed Nicols polarizing plates.
Figure 11:
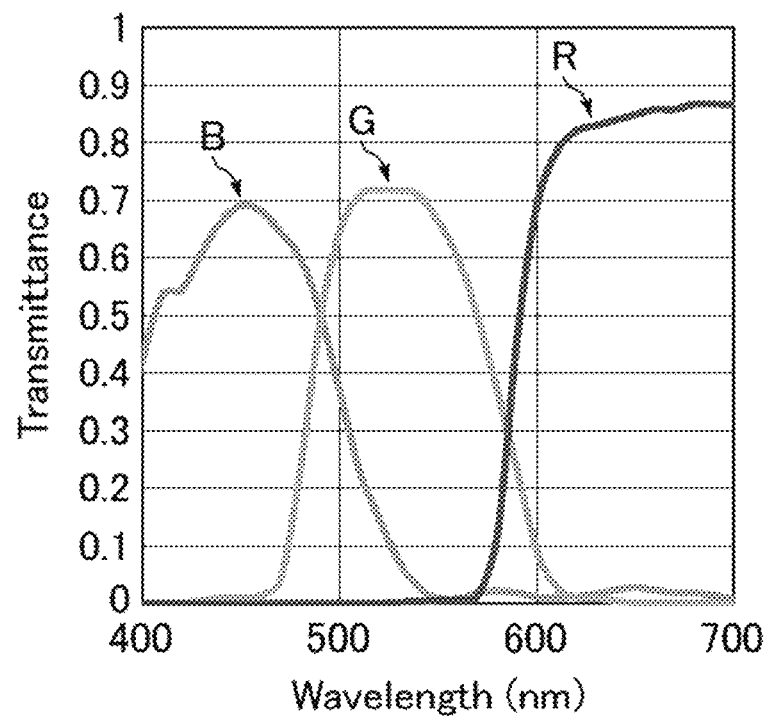
FIG. 11 is a graph showing transmission spectra of color filter layers (B, G, and R).
Figure 12:
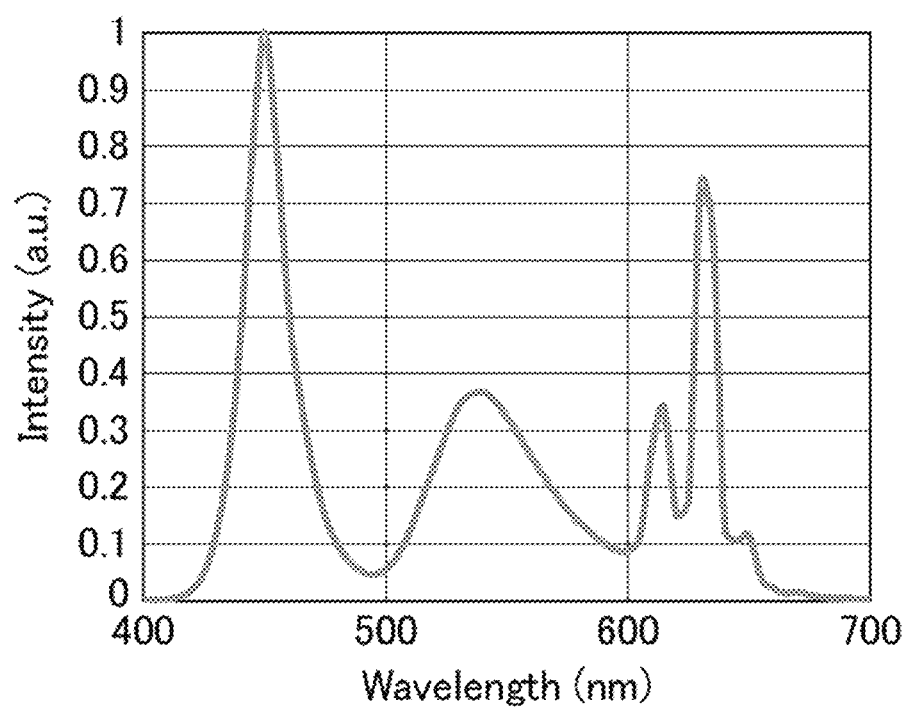
FIG. 12 is a graph showing the emission spectrum of a liquid crystal display LED backlight.

The birefringence Δn and the wavelength dispersion thereof of the reactive liquid crystal polymer constituting the in-cell λ/4 plate 32 and the out-cell λ/4 plate 31 were assumed to satisfy Δn(550)=0.10, Δn(450 nm)/Δn(550 nm)=1.12, and Δn(650 nm)/Δn(550 nm)=0.96. The transmission spectrum of the crossed Nicols polarizing plates was as shown in FIG. 10. The transmission spectra of the color filter layers (B, G, and R) were as shown in FIG. 11. The areas of the respective BGR colors were assumed equal to each other. The light source for calculation of the visibility corrected transmittance Y and the chromaticity diagram (x, y) was assumed to be a typical liquid crystal display LED backlight, and the emission spectrum thereof was as shown in FIG. 12. The overcoat layer, which is usually transparent and provides no retardation (birefringence), was ignored in the simulations. The horizontal alignment liquid crystal layer, though providing retardation (birefringence), was also ignored in the simulations because the alignment azimuth thereof was set parallel or perpendicular to the axial azimuth of the back surface side polarizing plate. The aperture ratios of the TFT substrate and the color filter substrate were assumed to be 100% for simplification of the simulations, although they were actually not 100%. In summary, the parameters necessary for the simulations were the spectra of the polarizing plates, the color filter layer, and the light source, and the birefringence Δn of the reactive liquid crystal polymer constituting the in-cell λ/4 plate 32 and the out-cell λ/4 plate 31 (or the retardation value obtained by multiplying the birefringence Δn and the thickness d).

(First Simulation)

Based on an assumption that only the linearly polarizing plate and the color filter layer were the components, the visibility corrected transmittance Y was calculated to be 0.000073 and the chromaticity diagram (x, y) was (0.243, 0.218). The obtained values correspond to the values in the ideal case where the in-cell λ/4 plate 32 and the out-cell λ/4 plate 31 perfectly cancel out each other's retardation, and are therefore used as the target values below.

(Second Simulation)

Figure 13:
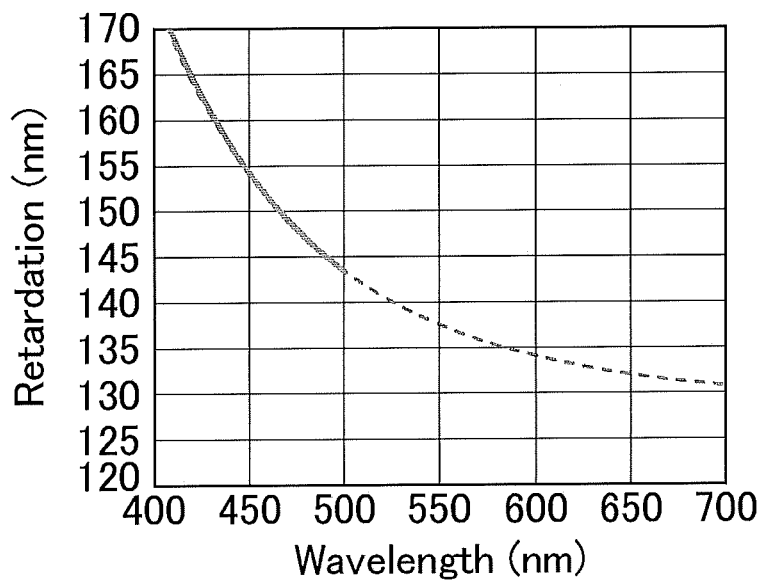
FIG. 13 is a graph showing the retardation wavelength dispersion in B regions of an in-cell λ/4 plate (normal wavelength dispersion material) that has a uniform thickness d of 1.375 μm and used in a second simulation.
Figure 14:
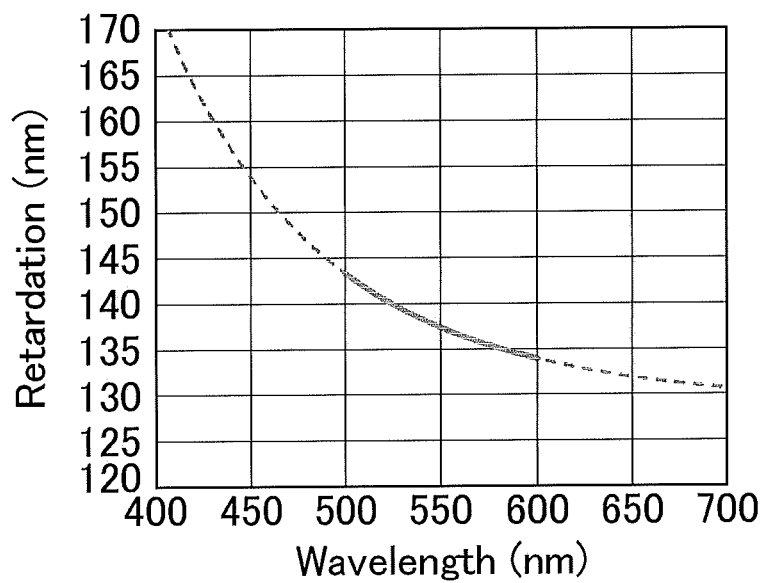
FIG. 14 is a graph showing the retardation wavelength dispersion in G regions of the in-cell λ/4 plate (normal wavelength dispersion material) that has a uniform thickness d of 1.375 μm and used in the second simulation.
Figure 15:
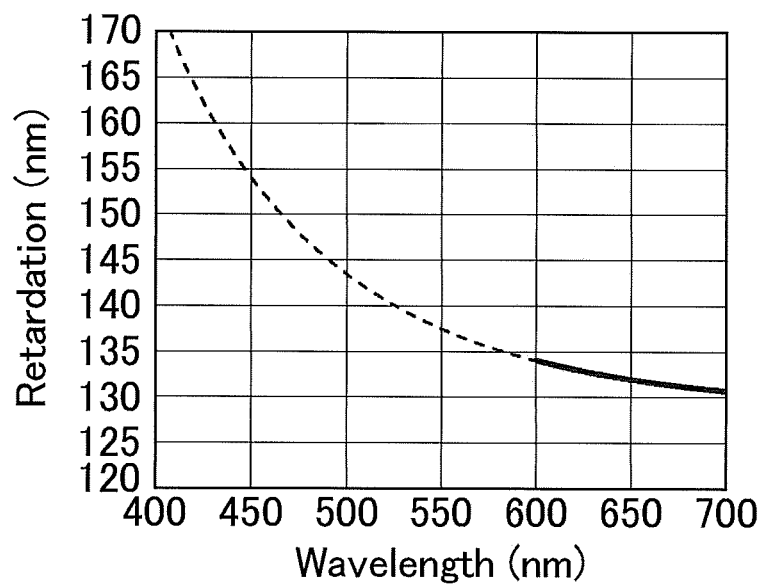
FIG. 15 is a graph showing the retardation wavelength dispersion in R regions of the in-cell λ/4 plate (normal wavelength dispersion material) that has a uniform thickness d of 1.375 μm and used in the second simulation.
Figure 16:
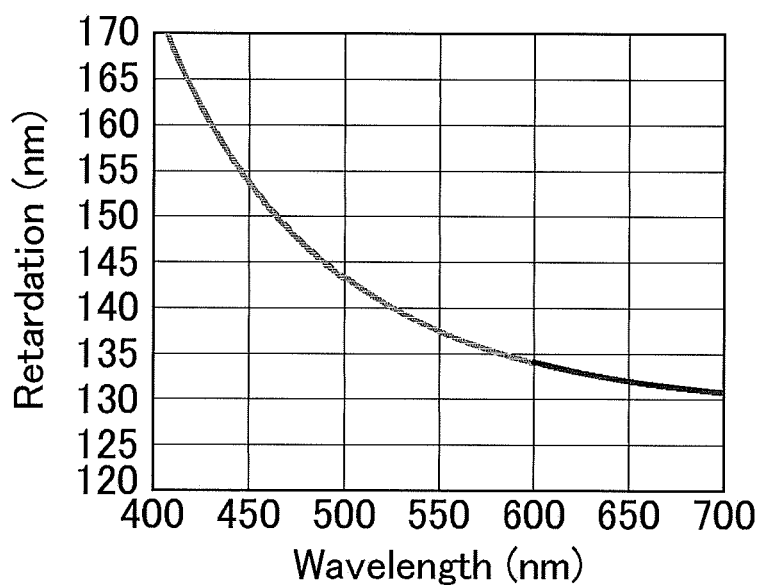
FIG. 16 is a graph showing the retardation wavelength dispersion of the in-cell λ/4 plate obtained by combining the retardations of the B, G, and R regions shown in FIGS. 13 to 15.

When an in-cell λ/4 plate 32 having a uniform thickness d of 1.375 μm is formed on a flat color filter substrate, the retardation wavelength dispersions of the B, G, and R regions are as shown in FIGS. 13 to 15. For convenience, the retardation for the blue color filters in the wavelength range of 400 to 500 nm, the retardation for the green color filters in the wavelength range of 500 to 600 nm, and the retardation for the red color filters in the wavelength range of 600 to 700 nm were combined and put in one graph as shown in FIG. 16.

As shown in FIG. 11, the spectral characteristics of the actual color filter layer are not perfect and include overlaps between the colors. For example, the blue color filters preferably transmit only blue light (typically, light having a wavelength of about 380 to 500 nm), but actually transmit green light having a wavelength of about 500 to 550 nm. The in-cell retardation layer disposed on the blue color filters therefore functions not only for incident light having a wavelength of 380 to 500 nm but also for incident light having a wavelength of 500 to 550 nm, for example. In view of this point, the characteristics of the entire in-cell λ/4 plate 32 disposed on the color filter layer cannot be exactly shown in the above combined graph. Still, the graph is used herein as it can be helpful to roughly understand the characteristics.

Figure 17:
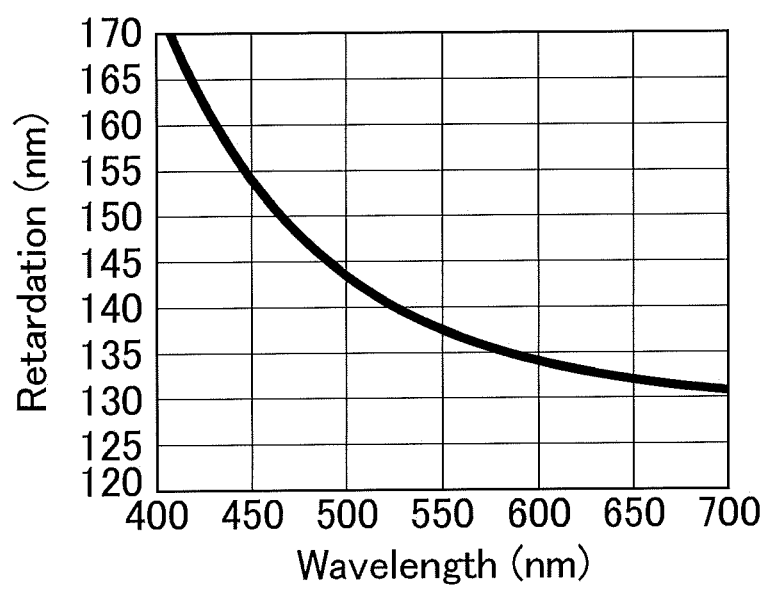
FIG. 17 is a graph showing the retardation wavelength dispersion of an out-cell λ/4 plate (normal wavelength dispersion material) used in the second simulation.

For matching the wavelength dispersibilities of the in-cell λ/4 plate 32 and the out-cell λ/4 plate 31, the out-cell λ/4 plate 31 having a uniform thickness d of 1.375 m was formed from the same normal wavelength dispersion material (reactive liquid crystal polymer) as the in-cell λ/4 plate 32. The retardation wavelength dispersion is as shown in FIG. 17.

Figure 18:
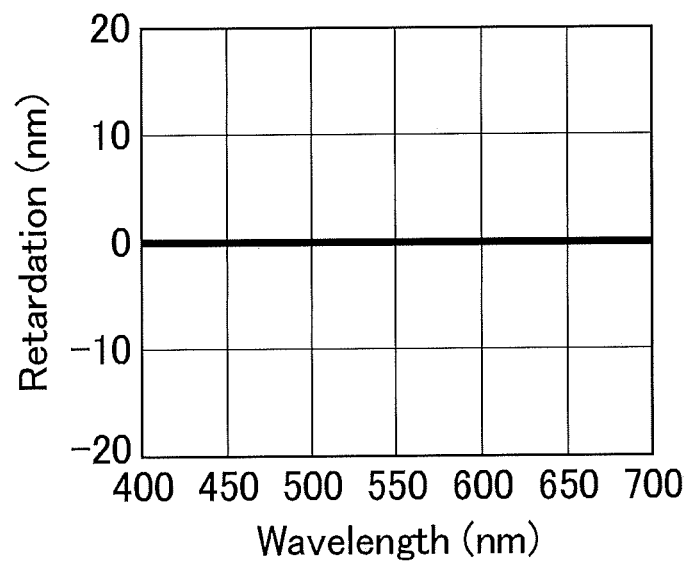
FIG. 18 is a graph showing the difference in retardation between the in-cell λ/4 plate and the out-cell λ/4 plate used in the second simulation.
Figure 19:
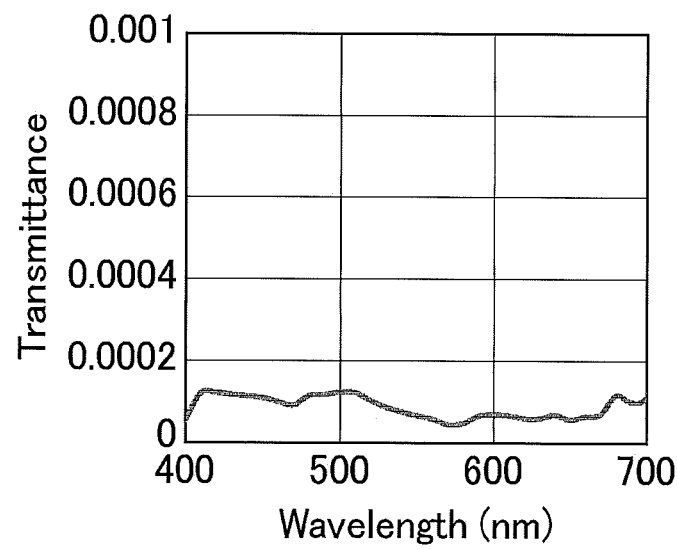
FIG. 19 is a graph showing the transmission spectrum of the black display achieved in the second simulation.

The retardation provided by the in-cell λ/4 plate 32 and the retardation provided by the out-cell λ/4 plate 31 match each other at every wavelength, and the difference between them is as shown in FIG. 18. In this state, favorable black display with a small light leakage amount at every wavelength can be achieved. The actual calculation result of the transmission spectrum of the black display is as shown in FIG. 19. The visibility corrected transmittance Y was 0.000073 and the chromaticity diagram (x, y) was (0.243, 0.218), which match the target values shown above.

The expression "flat color filter substrate" encompasses a color filter substrate whose BGR color filters (color layers), which are the main functional layers of the color filter substrate, have varying thicknesses, and the color filter substrate is considered flat as long as the overcoat layer on the color filter substrate sufficiently functions as a flattening layer. Conversely, a color filter substrate whose BGR color layers have a constant thickness is not considered as a "flat color filter substrate" if the overcoat layer thereon has a varying thickness.

(Third Simulation)

Figure 20:
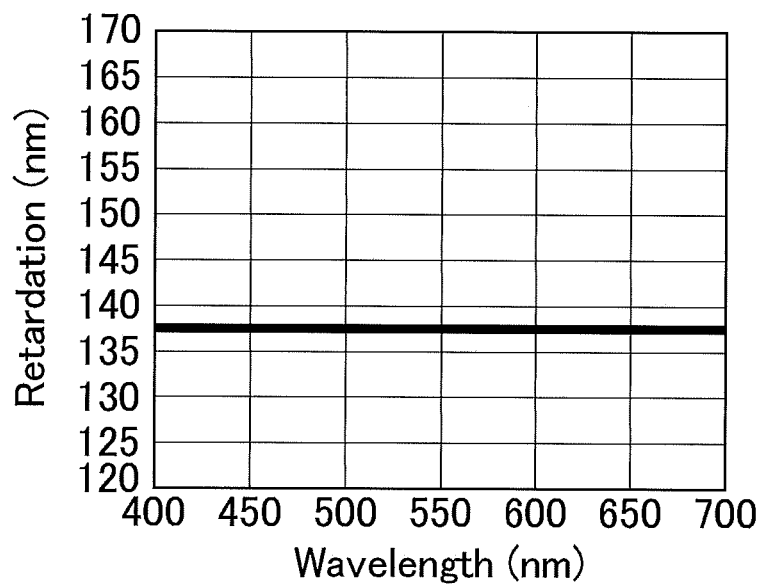
FIG. 20 is a graph showing the retardation wavelength dispersion of an out-cell λ/4 plate (flat wavelength dispersion material) used in a third simulation.

The case is considered where the out-cell λ/4 plate 31 is formed from a different material from the in-cell λ/4 plate 32. Here, a retardation film formed from a cycloolefin polymer (COP), which is a flat wavelength dispersion material, is used in order to increase the heat resistance. The assumed COP film is "ZEONOR film ZF14" from Zeon Corporation. The wavelength dispersibility obtained with the birefringence thereof satisfies Δn(450 nm)/Δn(550 nm)=1.00 and Δn(650 nm)/Δn(550 nm)=1.00. In the case where the retardation at a wavelength of 550 nm, which is the center wavelength for typical design of a retardation film, is adjusted to 137.5 nm, the resulting retardation wavelength dispersion is as shown in FIG. 20.

Figure 21:
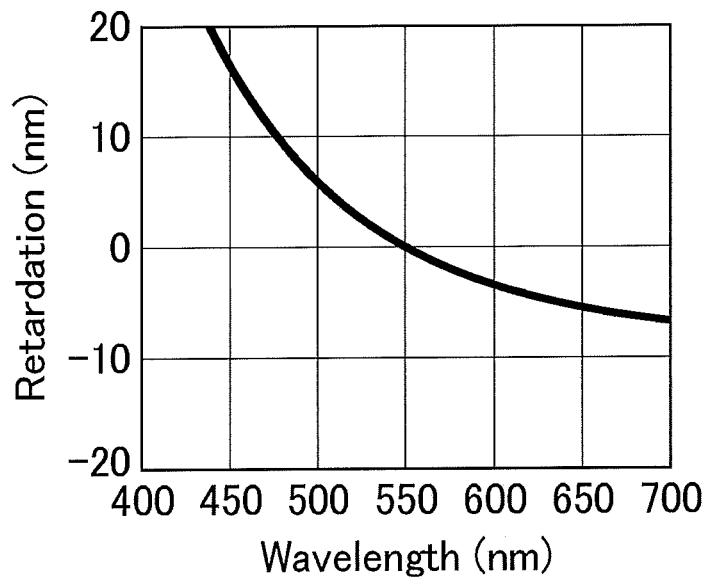
FIG. 21 is a graph showing the difference in retardation between an in-cell λ/4 plate and the out-cell λ/4 plate used in the third simulation.
Figure 22:
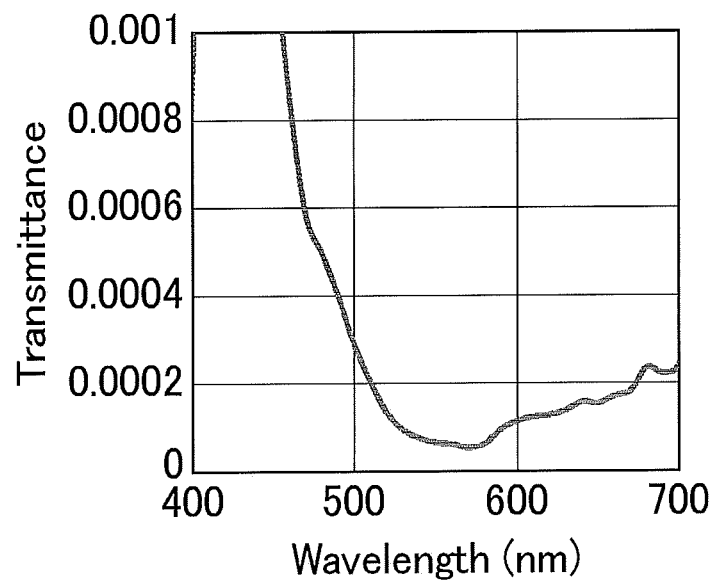
FIG. 22 is a graph showing the transmission spectrum of the black display achieved in the third simulation.

In this case, the retardation provided by the in-cell λ/4 plate 32 and the retardation provided by the out-cell λ/4 plate 31 do not match each other at wavelengths other than 550 nm, and the difference therebetween is as shown in FIG. 21. The in-cell λ/4 plate 32 and the out-cell λ/4 plate 31 therefore cannot cancel out each other's retardation at wavelengths other than 550 nm, so that light leakage occurs during the black display and the screen is colored. The actual calculation result of the transmission spectrum of the black display is as shown in FIG. 22. The visibility corrected transmittance Y was 0.000138 and the chromaticity diagram (x, y) was (0.177, 0.054). Thereby, the screen was colored in blue during the black display.

(Fourth Simulation)

In the case where the out-cell λ/4 plate 31 is formed from a different material from the in-cell λ/4 plate 32, adjusting the thickness of the in-cell λ/4 plate 32 according to the corresponding color of the color filter layer enables the λ/4 plates to cancel out each other's retardation and achieve favorable black display at least at the dominant wavelengths (typically corresponding to the dominant wavelengths of the BGR three primary colors, such as 450 nm, 550 nm, 650 nm) of the spectral transmittances of the color filters in the respective colors.

Figure 23:
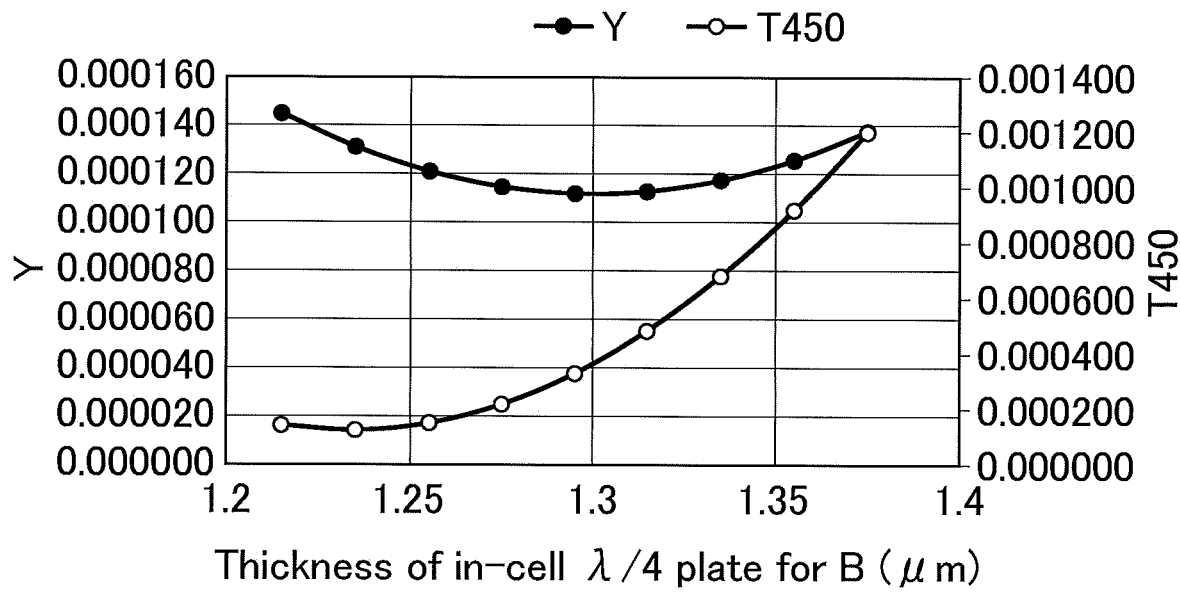
FIG. 23 is a graph showing the visibility corrected transmittance Y and the transmittance T450 at a wavelength of 450 nm in the cases where the in-cell λ/4 plate has a constant thickness of 1.375 μm for G and R and a varying thickness for B.

The calculation results in the case where the thickness of the in-cell λ/4 plate 32 for B was varied within a certain range while the thicknesses of the in-cell λ/4 plate 32 for G and R were fixed to 1.375 μm are shown in the following Table 1 and FIG. 23. Y represents the visibility corrected transmittance. T450, T500, and T550 represent the transmittances at wavelengths of 450 nm, 500 nm, and 550 nm, respectively.

TABLE 1

| Thickness (μm) | Y | T450 | T500 | T550 |
| --- | --- | --- | --- | --- |
| 1.375 | 0.000138 | 0.001200 | 0.000290 | 0.000066 |
| 1.355 | 0.000126 | 0.000919 | 0.000252 | 0.000066 |
| 1.335 | 0.000117 | 0.000681 | 0.000233 | 0.000067 |
| 1.315 | 0.000113 | 0.000484 | 0.000231 | 0.000068 |
| 1.295 | 0.000112 | 0.000330 | 0.000247 | 0.000069 |
| 1.275 | 0.000115 | 0.000219 | 0.000282 | 0.000071 |
| 1.255 | 0.000121 | 0.000151 | 0.000334 | 0.000073 |
| 1.235 | 0.000131 | 0.000125 | 0.000404 | 0.000075 |
| 1.215 | 0.000145 | 0.000143 | 0.000493 | 0.000078 |

For minimization of light leakage at a wavelength of 450 nm and reduction of the bluish coloring during the black display, the thickness of the in-cell λ/4 plate 32 for B is preferably set to 1.235 μm. At this time, light leakage at the other wavelengths is not minimized, so that the visibility corrected transmittance Y is not the minimum value. The thickness giving the minimum visibility corrected transmittance Y was, according to calculation, 1.295 μm.

Figure 24:
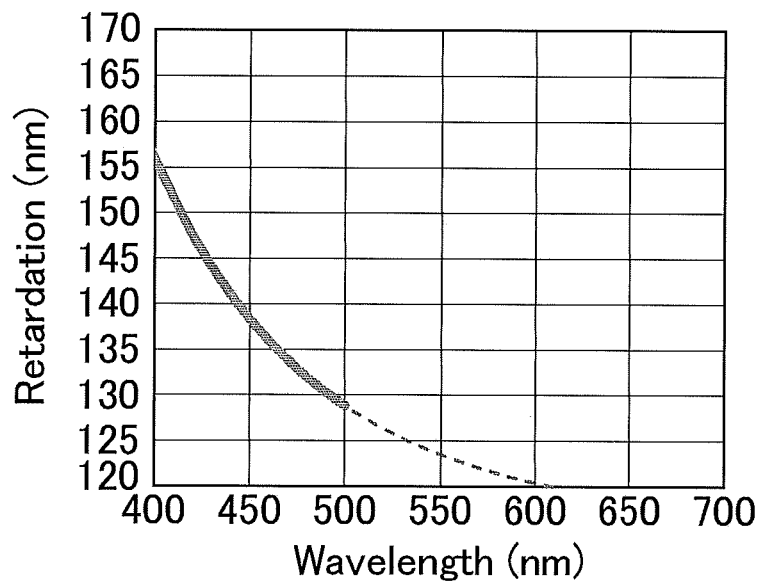
FIG. 24 is a graph showing the retardation wavelength dispersion in B regions in the case where the in-cell λ/4 plate has a thickness of 1.375 μm for G and R and a thickness of 1.235 μm for B.
Figure 25:
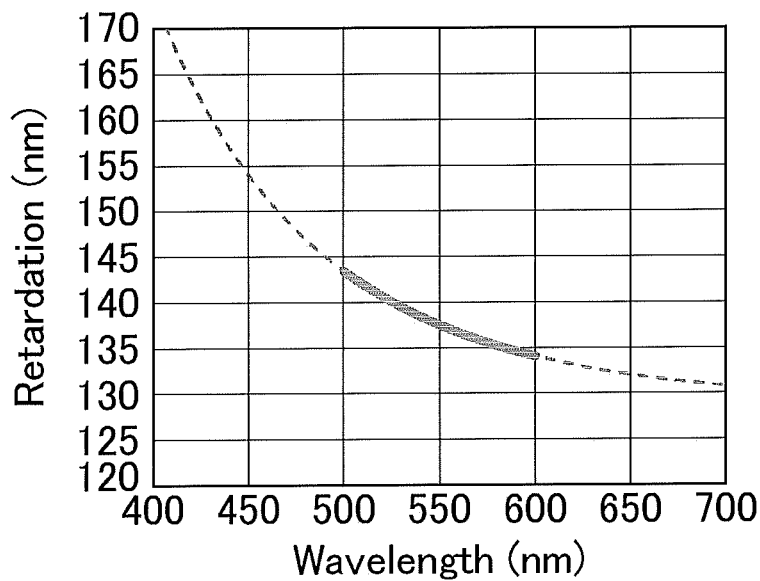
FIG. 25 is a graph showing the retardation wavelength dispersion in G regions in the case where the in-cell λ/4 plate has a thickness of 1.375 μm for G and R and a thickness of 1.235 μm for B.
Figure 26:
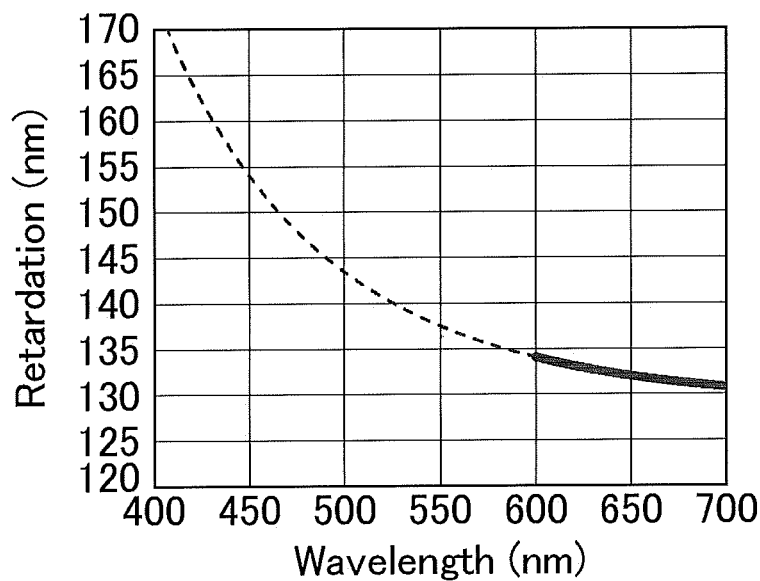
FIG. 26 is a graph showing the retardation wavelength dispersion in R regions in the case where the in-cell λ/4 plate has a thickness of 1.375 μm for G and R and a thickness of 1.235 μm for B.
Figure 27:
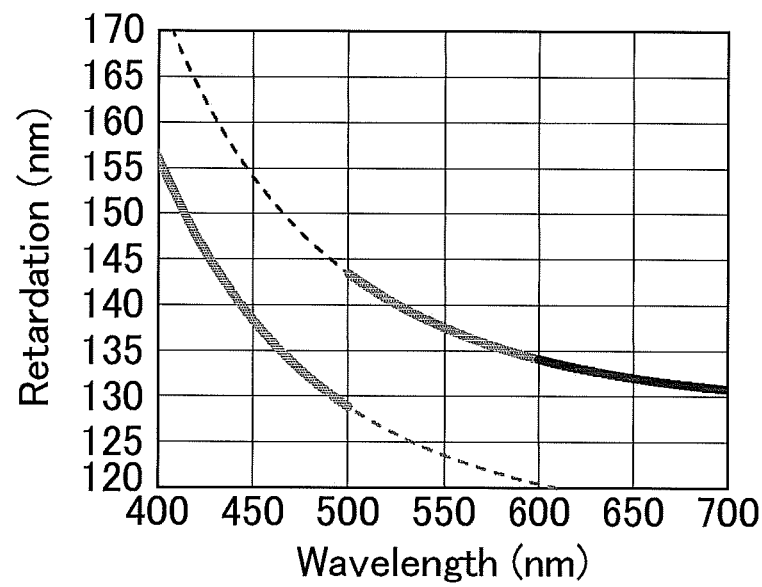
FIG. 27 is a graph showing the retardation wavelength dispersion of the in-cell λ/4 plate obtained by combining the retardations of the B, G, and R regions shown in FIGS. 24 to 26.
Figure 28:
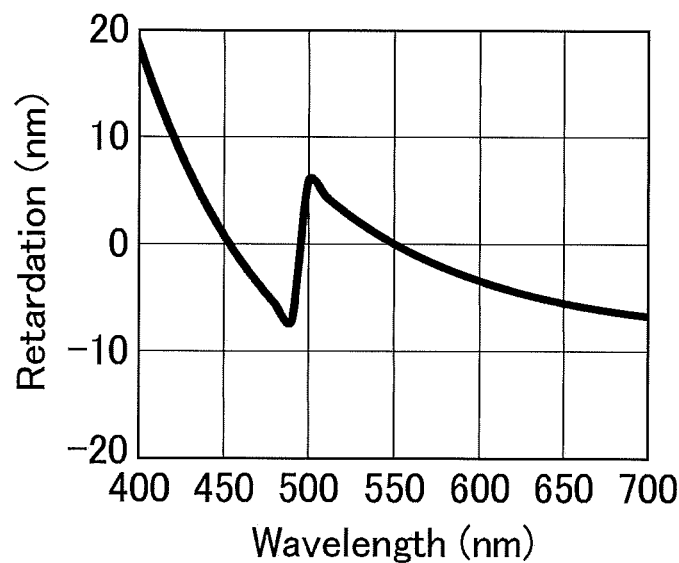
FIG. 28 is a graph showing the difference in retardation between the in-cell λ/4 plate and the out-cell λ/4 plate in a fourth simulation in the case where the in-cell λ/4 plate has a thickness of 1.235 μm for B.
Figure 29:
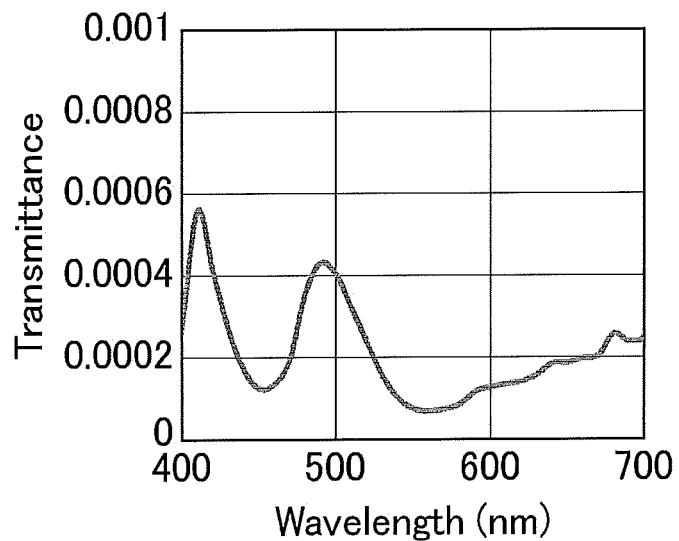
FIG. 29 is a graph showing the transmission spectrum of the black display achieved in the fourth simulation in the case where the in-cell λ/4 plate has a thickness of 1.235 μm for B.

The simulation results in the case where the thickness of the in-cell λ/4 plate 32 for B was 1.235 μm are shown in FIGS. 24 to 29. FIG. 24 shows the retardation wavelength dispersion in the B regions. FIG. 25 shows the retardation wavelength dispersion in the G regions. FIG. 26 shows the retardation wavelength dispersion in the R regions. FIG. 27 is a graph showing the wavelength dispersion of the in-cell λ/4 plate 32 obtained by combining the retardations of the B, G, and R regions into one graph. FIG. 28 shows the difference in retardation between the in-cell λ/4 plate 32 and the out-cell λ/4 plate 31. FIG. 29 shows the transmission spectrum during the black display.

In the case where the thickness of the in-cell λ/4 plate 32 for B is 1.235 μm, the visibility corrected transmittance Y was 0.000131 and the chromaticity diagram (x, y) was (0.265, 0.241).

Figure 30:
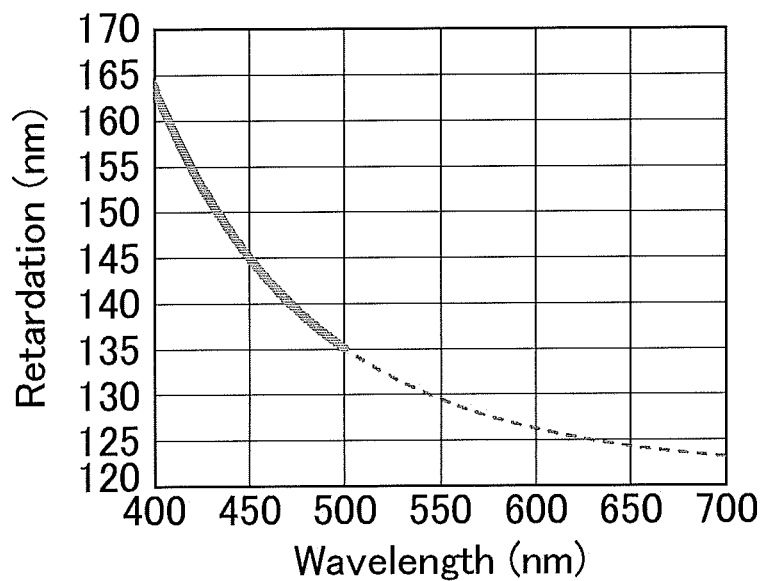
FIG. 30 is a graph showing the retardation wavelength dispersion in B regions in the case where the in-cell λ/4 plate has a thickness of 1.375 μm for G and R and a thickness of 1.295 μm for B.
Figure 31:
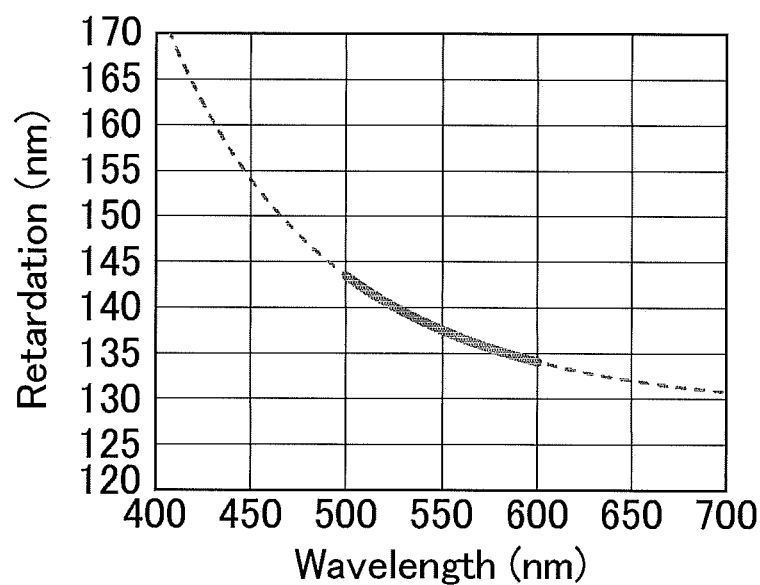
FIG. 31 is a graph showing the retardation wavelength dispersion in G regions in the case where the in-cell λ/4 plate has a thickness of 1.375 μm for G and R and a thickness of 1.295 μm for B.
Figure 32:
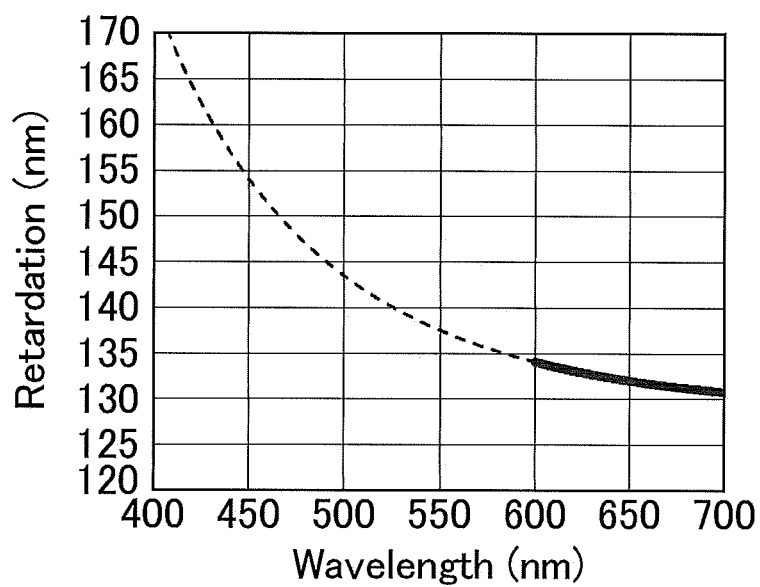
FIG. 32 is a graph showing the retardation wavelength dispersion in R regions in the case where the in-cell λ/4 plate has a thickness of 1.375 μm for G and R and a thickness of 1.295 μm for B.
Figure 33:
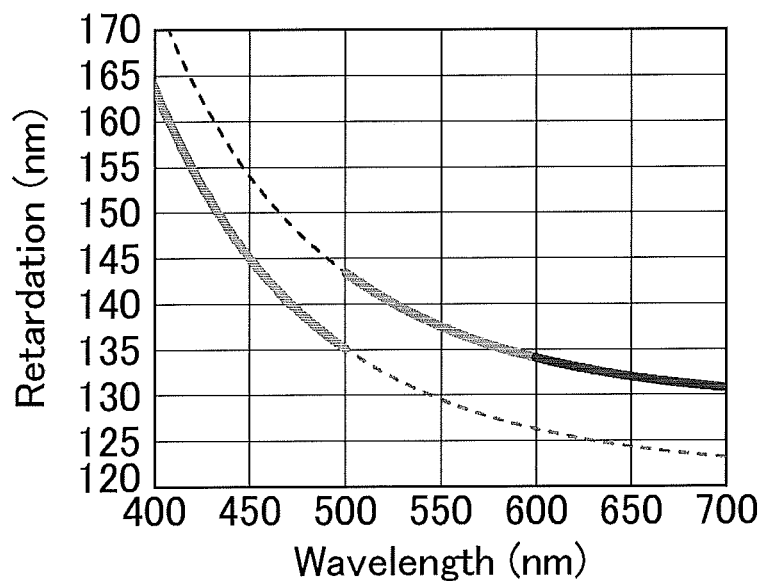
FIG. 33 is a graph showing the retardation wavelength dispersion of the in-cell λ/4 plate obtained by combining the retardations of the B, G, and R regions shown in FIGS. 30 to 32.
Figure 34:
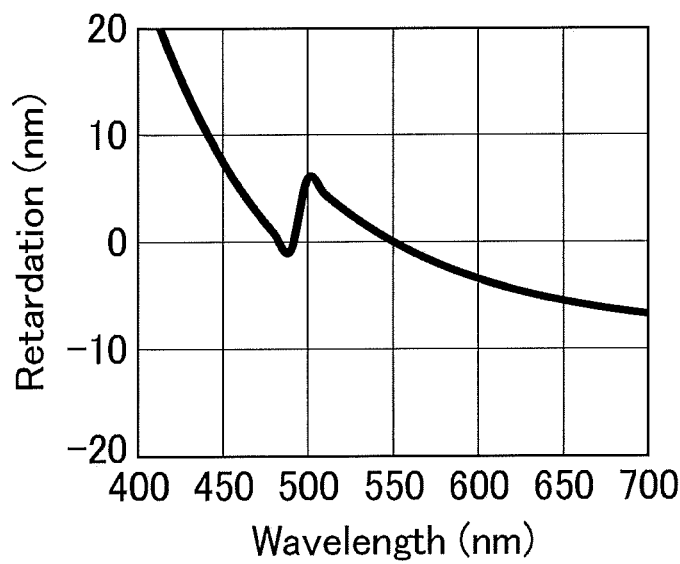
FIG. 34 is a graph showing the difference in retardation between the in-cell λ/4 plate and the out-cell λ/4 plate in the fourth simulation in the case where the in-cell λ/4 plate has a thickness of 1.295 μm for B.
Figure 35:
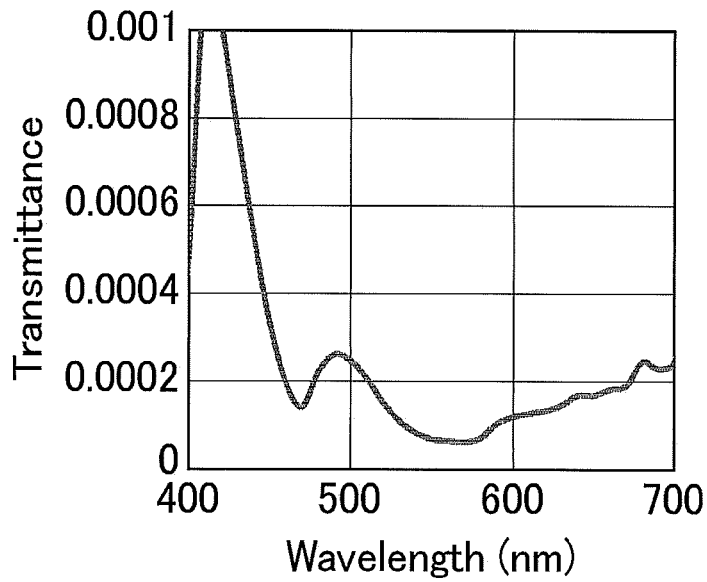
FIG. 35 is a graph showing the transmission spectrum of the black display achieved in the fourth simulation in the case where the in-cell λ/4 plate has a thickness of 1.295 μm for B.

The simulation results in the case where the thickness of the in-cell λ/4 plate 32 for B was 1.295 μm are shown in FIGS. 30 to 35. FIG. 30 shows the retardation wavelength dispersion in the B regions. FIG. 31 shows the retardation wavelength dispersion in the G regions. FIG. 32 shows the retardation wavelength dispersion in the R regions. FIG. 33 is a graph showing the wavelength dispersion of the in-cell λ/4 plate 32 obtained by combining the retardations of the B, G, and R regions into one graph. FIG. 34 shows the difference in retardation between the in-cell λ/4 plate 32 and the out-cell λ/4 plate 31. FIG. 35 shows the transmission spectrum during the black display.

In the case where the thickness of the in-cell λ/4 plate 32 for B was 1.295 μm, the visibility corrected transmittance Y was 0.000112 and the chromaticity diagram (x, y) was (0.221, 0.126).

(Fifth Simulation)

Figure 36:
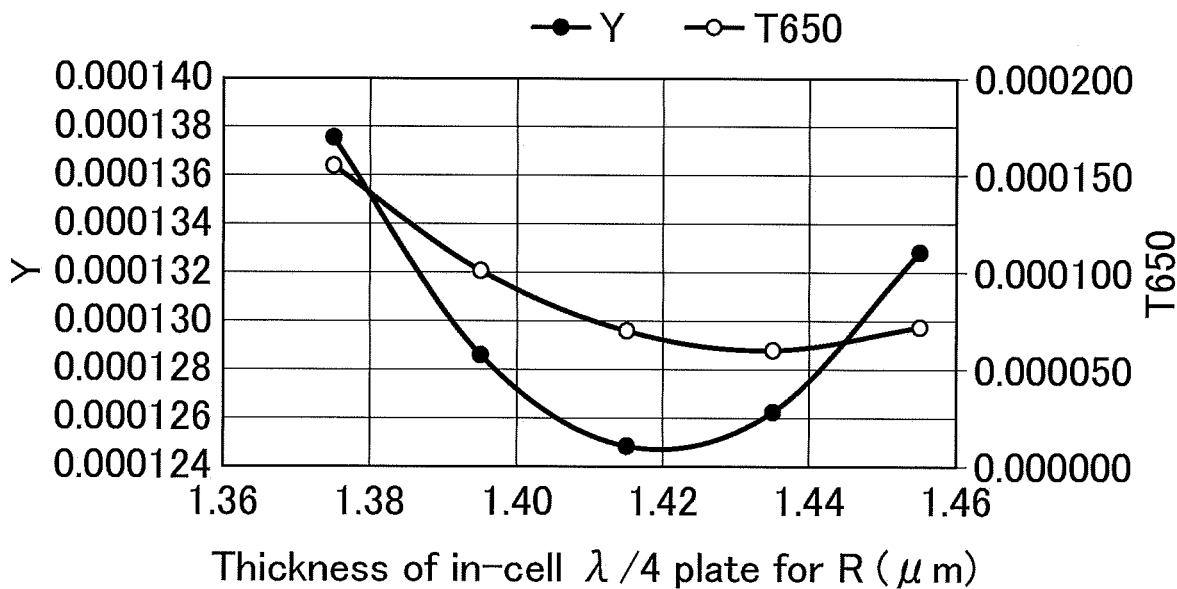
FIG. 36 is a graph showing the visibility corrected transmittance Y and the transmittance T650 at a wavelength of 650 nm in the cases where the in-cell λ/4 plate has a constant thickness of 1.375 μm for B and G and a varying thickness for R.

The calculation results in the case where the thickness of the in-cell λ/4 plate 32 for R was varied within a certain range while the thicknesses of the in-cell λ/4 plates 32 for B and G were fixed to 1.375 μm are shown in the following Table 2 and FIG. 36. Y represents the visibility corrected transmittance. T550, T600, and T650 represent the transmittances at wavelengths of 550 nm, 600 nm, and 650 nm, respectively.

TABLE 2

| Thickness (μm) | Y | T550 | T600 | T650 |
|---|---|---|---|---|
| 1.375 | 0.000138 | 0.000066 | 0.000115 | 0.000155 |
| 1.395 | 0.000129 | 0.000066 | 0.000085 | 0.000101 |
| 1.415 | 0.000125 | 0.000067 | 0.000076 | 0.000070 |
| 1.435 | 0.000126 | 0.000067 | 0.000089 | 0.000060 |
| 1.455 | 0.000133 | 0.000068 | 0.000122 | 0.000072 |

For minimization of light leakage at a wavelength of 650 nm and reduction of the reddish coloring during the black display, the thickness of the in-cell λ/4 plate 32 for R is preferably set to 1.435 μm. At this time, light leakage at the other wavelengths is not minimized, so that the visibility corrected transmittance Y is not the minimum value. The thickness giving the minimum visibility corrected transmittance Y was, according to calculation, 1.415 μm. Yet, the performance difference between the two optimal values (thickness of 1.435 μm and thickness of 1.415 μm) was not as large as in the case of B.

Figure 37:
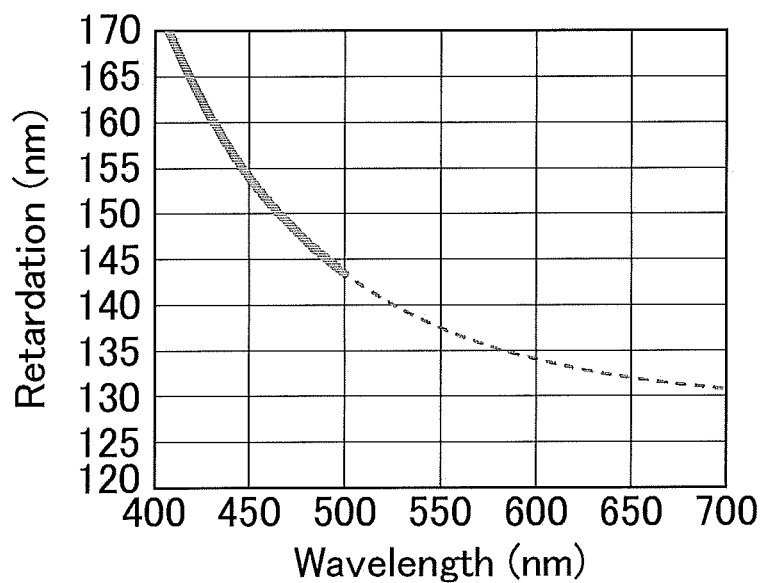
FIG. 37 is a graph showing the retardation wavelength dispersion in B regions in the case where the in-cell λ/4 plate has a thickness of 1.375 μm for B and G and a thickness of 1.435 μm for R.
Figure 38:
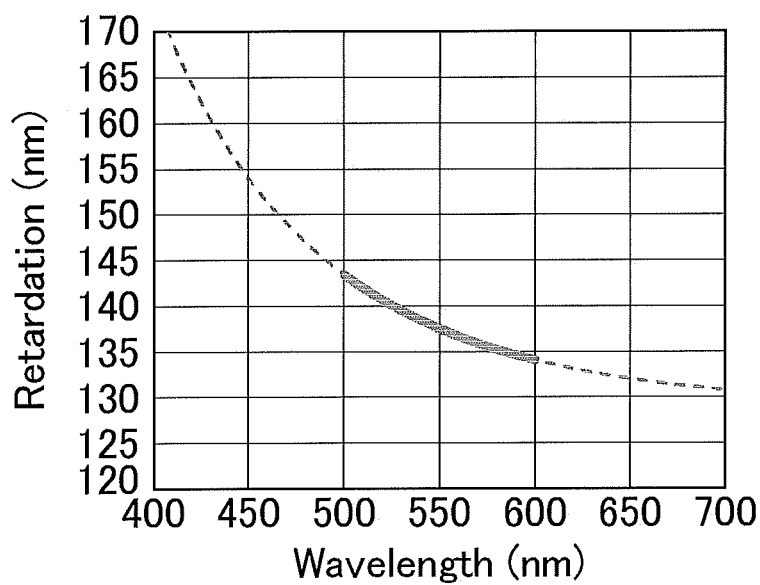
FIG. 38 is a graph showing the retardation wavelength dispersion in G regions in the case where the in-cell λ/4 plate has a thickness of 1.375 μm for B and G and a thickness of 1.435 μm for R.
Figure 39:
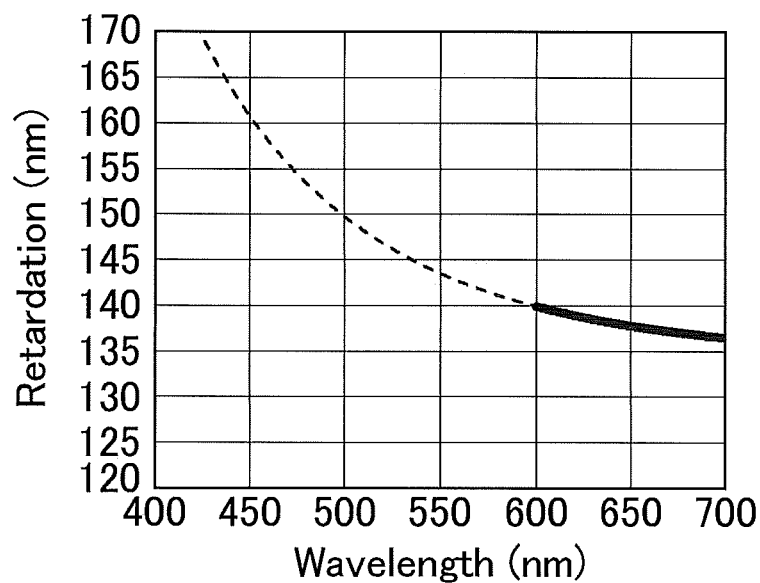
FIG. 39 is a graph showing the retardation wavelength dispersion in R regions in the case where the in-cell λ/4 plate has a thickness of 1.375 μm for B and G and a thickness of 1.435 μm for R.
Figure 40:
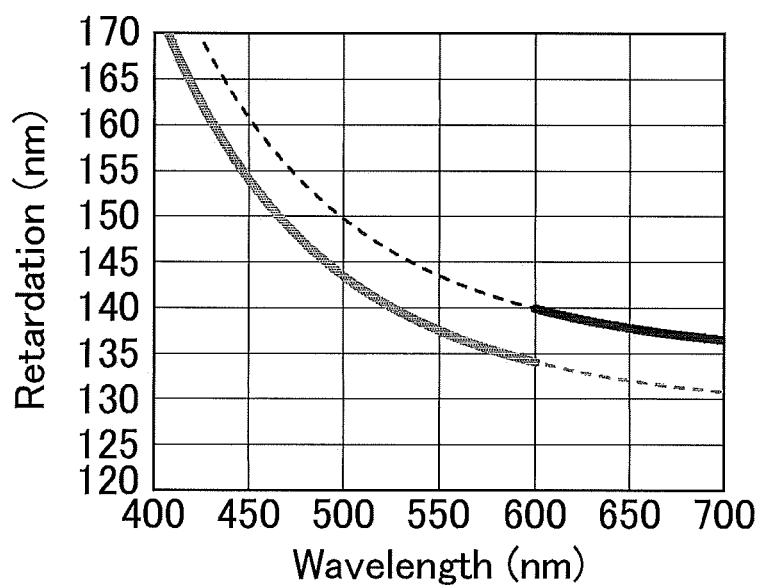
FIG. 40 is a graph showing the retardation wavelength dispersion of the in-cell λ/4 plate obtained by combining the retardations of the B, G, and R regions shown in FIGS. 37 to 39.
Figure 41:
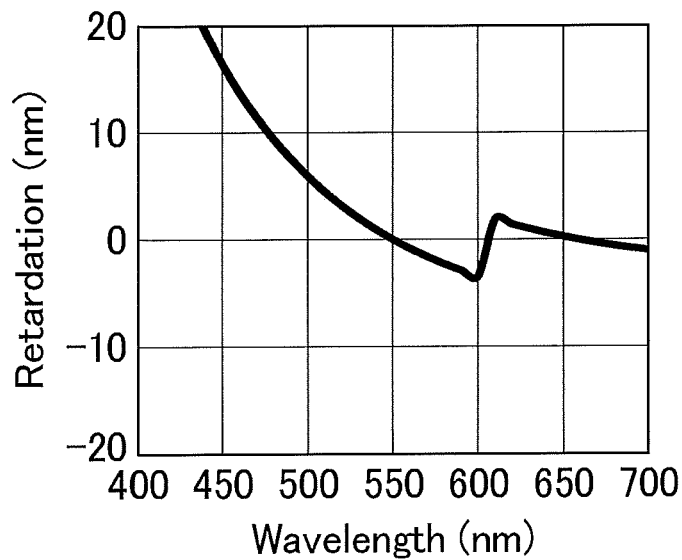
FIG. 41 is a graph showing the difference in retardation between the in-cell λ/4 plate and the out-cell λ/4 plate in a fifth simulation in the case where the in-cell λ/4 plate has a thickness of 1.435 μm for R.
Figure 42:
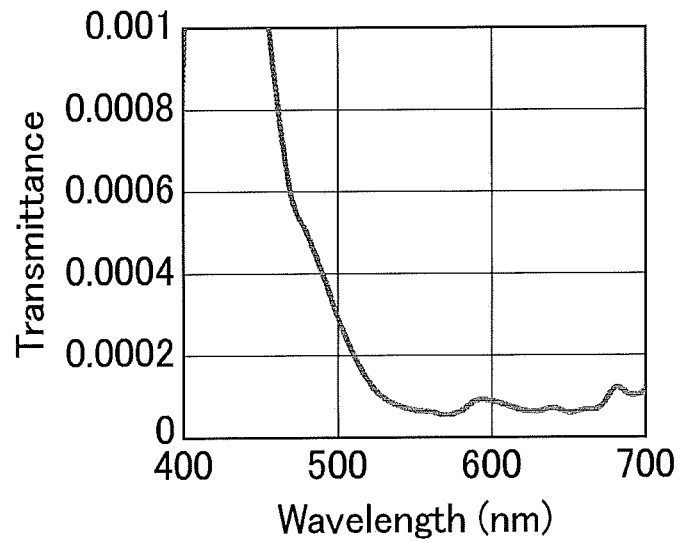
FIG. 42 is a graph showing the transmission spectrum of the black display achieved in the fifth simulation in the case where the in-cell λ/4 plate has a thickness of 1.435 μm for R.

The simulation results in the case where the thickness of the in-cell λ/4 plate 32 for R was 1.435 μm are shown in FIGS. 37 to 42. FIG. 37 shows the retardation wavelength dispersion in the B regions. FIG. 38 shows the retardation wavelength dispersion in the G regions. FIG. 39 shows the retardation wavelength dispersion in the R regions. FIG. 40 is a graph showing the wavelength dispersion of the in-cell λ/4 plate 32 obtained by combining the retardations of the B, G, and R regions into one graph. FIG. 41 shows the difference in retardation between the in-cell λ/4 plate 32 and the out-cell λ/4 plate 31. FIG. 42 shows the transmission spectrum during the black display.

In the case where the thickness of the in-cell λ/4 plate 32 for R is 1.435 μm, the visibility corrected transmittance Y was 0.000126 and the chromaticity diagram (x, y) was (0.169, 0.051).

Figure 43:
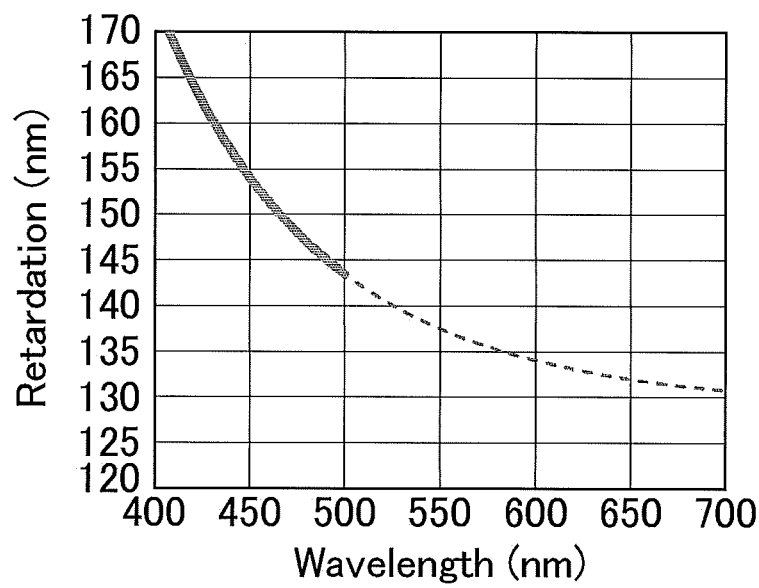
FIG. 43 is a graph showing the retardation wavelength dispersion in B regions in the case where the in-cell λ/4 plate has a thickness of 1.375 μm for B and G and a thickness of 1.415 μm for R.
Figure 44:
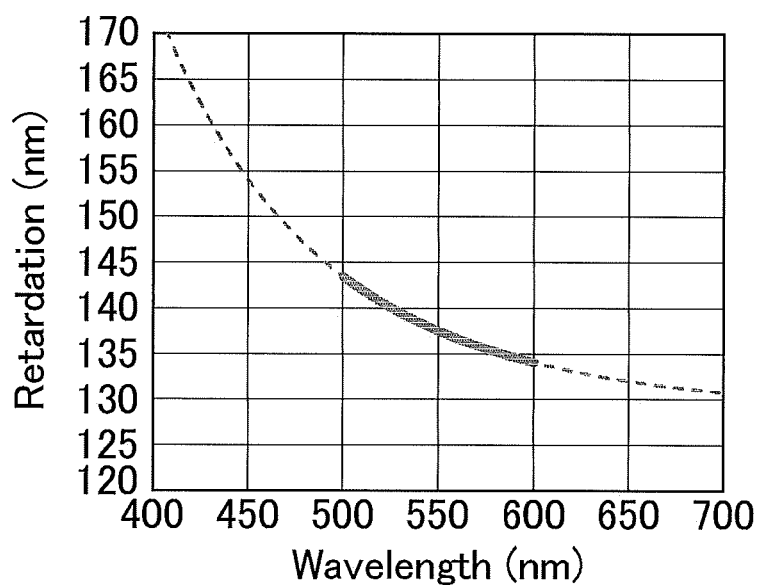
FIG. 44 is a graph showing the retardation wavelength dispersion in G regions in the case where the in-cell λ/4 plate has a thickness of 1.375 μm for B and G and a thickness of 1.415 μm for R.
Figure 45:
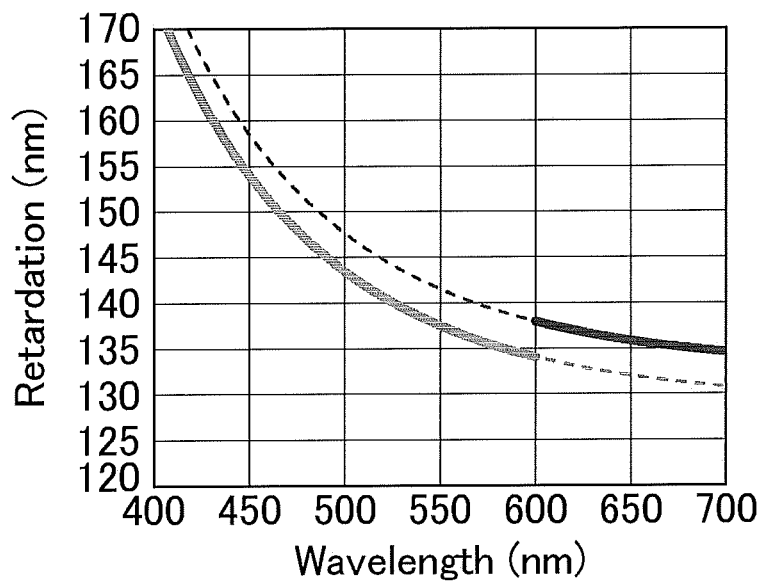
FIG. 45 is a graph showing the retardation wavelength dispersion in R regions in the case where the in-cell λ/4 plate has a thickness of 1.375 μm for B and G and a thickness of 1.415 μm for R.
Figure 46:
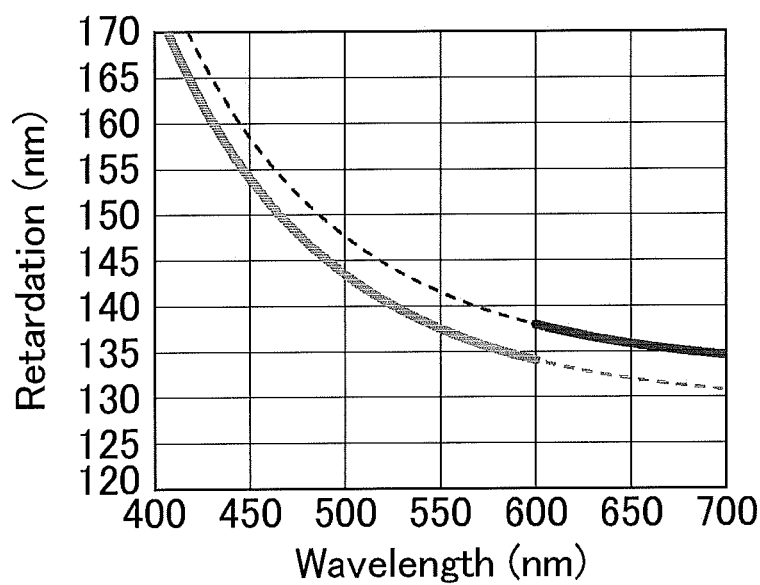
FIG. 46 is a graph showing the retardation wavelength dispersion of the in-cell λ/4 plate obtained by combining the retardations of the B, G, and R regions shown in FIGS. 43 to 45.
Figure 47:
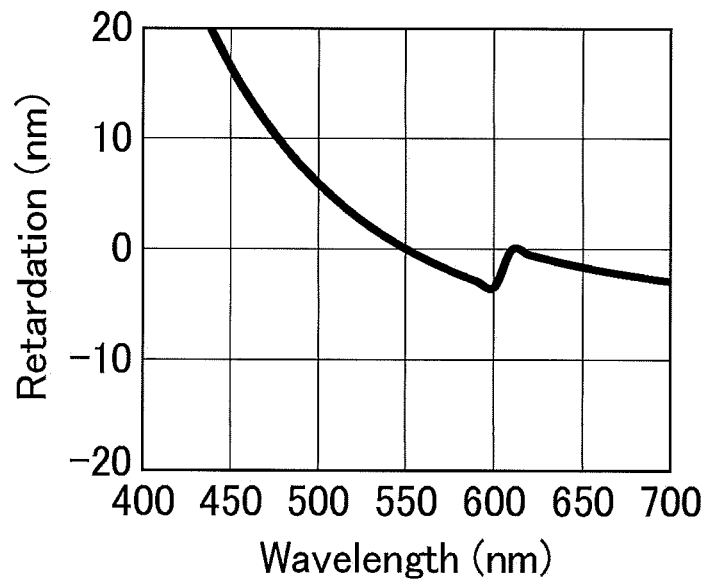
FIG. 47 is a graph showing the difference in retardation between the in-cell λ/4 plate and the out-cell λ/4 plate in the fifth simulation in the case where the in-cell λ/4 plate has a thickness of 1.415 μm for R.
Figure 48:
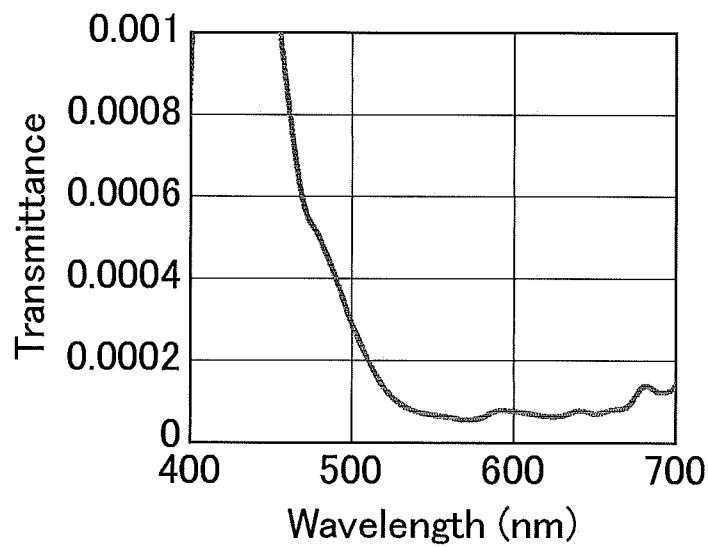
FIG. 48 is a graph showing the transmission spectrum of the black display achieved in the fifth simulation in the case where the in-cell λ/4 plate has a thickness of 1.415 μm for R.

The simulation results in the case where the thickness of the in-cell λ/4 plate 32 for R was 1.415 μm are shown in FIGS. 43 to 48. FIG. 43 shows the retardation wavelength dispersion in the B regions. FIG. 44 shows the retardation wavelength dispersion in the G regions. FIG. 45 shows the retardation wavelength dispersion in the R regions. FIG. 46 is a graph showing the wavelength dispersion of the in-cell λ/4 plate 32 obtained by combining the retardations in the B, G, and R regions into one graph. FIG. 47 shows the difference in retardation between the in-cell λ/4 plate 32 and the out-cell λ/4 plate 31. FIG. 48 shows the transmission spectrum during the black display.

In the case where the thickness of the in-cell λ/4 plate 32 for R was 1.415 μm, the visibility corrected transmittance Y was 0.000125 and the chromaticity diagram (x, y) was (0.169, 0.050).

Hereinabove, the blue color filters and the red color filters were optimized separately. Based on the above results, liquid crystal display devices of examples and comparative examples were produced as shown in the following Table 3.

The liquid crystal display devices of the examples and the comparative examples were produced in view of the following points.

Comparative Example 1 corresponds to the second simulation where the out-cell λ/4 plate 31 and the in-cell λ/4 plate 32 were formed from the same normal wavelength dispersion material (reactive liquid crystal polymer). In Comparative Examples 2 to 5 and Examples 1 to 8, the out-cell λ/4 plate 31 was formed using a COP film (flat wavelength dispersion material) whose wavelength dispersibility was different from that of the in-cell λ/4 plate 32. Comparative Example 2 corresponds to the second simulation where the thickness of the in-cell λ/4 plate 32 for B, G, and R was all 1.375 m, meaning that the thickness of the in-cell λ/4 plate 32 was not optimized for each color. Comparative Examples 3 to 5 and Examples 1 to 8 are examples in which the thickness of the in-cell λ/4 plate 32 for B was decreased and the thickness of the in-cell λ/4 plate 32 for R was increased. Specifically, the thickness of the in-cell λ/4 plate 32 for B decreases and the thickness of the in-cell λ/4 plate 32 for R increases in the order of Comparative Example 2, Comparative Example 3, Comparative Example 4, Example 1, Example 2, Example 3, Example 4, Example 5, Example 6, Example 7, Example 8, and Comparative Example 5.

TABLE 3

| | Thickness of in-cell λ/4 plate (μm) | | | Difference in retardation (nm) | | Simulation evaluation | | | Subjective evaluation | |
|---|---|---|---|---|---|---|---|---|---|---|
| | B | G | R | B | R | Y | x | y | Light leakage | Coloring |
| Comparative Example 1 | 1.375 | 1.375 | 1.375 | 0.0 | 0.0 | 0.000073 | 0.243 | 0.218 | A | A |
| Comparative Example 2 | 1.375 | 1.375 | 1.375 | 16.5 | −5.5 | 0.000138 | 0.177 | 0.054 | C | C |
| Comparative Example 3 | 1.335 | 1.375 | 1.395 | 12.0 | −3.6 | 0.000108 | 0.183 | 0.072 | B | C |
| Comparative Example 4 | 1.325 | 1.375 | 1.400 | 10.9 | −3.1 | 0.000104 | 0.186 | 0.079 | A | C |
| Example 1 | 1.315 | 1.375 | 1.405 | 9.8 | −2.6 | 0.000101 | 0.189 | 0.089 | A | B |

TABLE 3-continued

| | Thickness of in-cell λ/4 plate (μm) | | | Difference in retardation (nm) | | Simulation evaluation | | | Subjective evaluation | |
|---|---|---|---|---|---|---|---|---|---|---|
| | B | G | R | B | R | Y | x | y | Light leakage | Coloring |
| Example 2 | 1.305 | 1.375 | 1.410 | 8.7 | −2.1 | 0.000100 | 0.193 | 0.102 | A | B |
| Example 3 | 1.295 | 1.375 | 1.415 | 7.5 | −1.7 | 0.000099 | 0.198 | 0.117 | A | B |
| Example 4 | 1.280 | 1.375 | 1.420 | 5.9 | −1.2 | 0.000101 | 0.208 | 0.146 | A | B |
| Example 5 | 1.265 | 1.375 | 1.425 | 4.2 | −0.7 | 0.000105 | 0.219 | 0.180 | A | B |
| Example 6 | 1.250 | 1.375 | 1.430 | 2.5 | −0.2 | 0.000111 | 0.227 | 0.214 | B | A |
| Example 7 | 1.235 | 1.375 | 1.435 | 0.8 | 0.3 | 0.000120 | 0.232 | 0.236 | B | A |
| Example 8 | 1.220 | 1.375 | 1.440 | −0.9 | 0.7 | 0.000131 | 0.229 | 0.240 | B | A |
| Comparative Example 5 | 1.205 | 1.375 | 1.445 | −2.5 | 1.2 | 0.000145 | 0.223 | 0.229 | C | A |

(Simulation Evaluation)

The visibility corrected transmittance Y and the chromaticity diagram (x, y) in the examples and the comparative examples were determined. The obtained results are shown in Table 3. The visibility corrected transmittance Y was minimized in Example 3. The chromaticity (coloring) was closest to the target value (0.243, 0.218) in Example 7.

Figure 49:
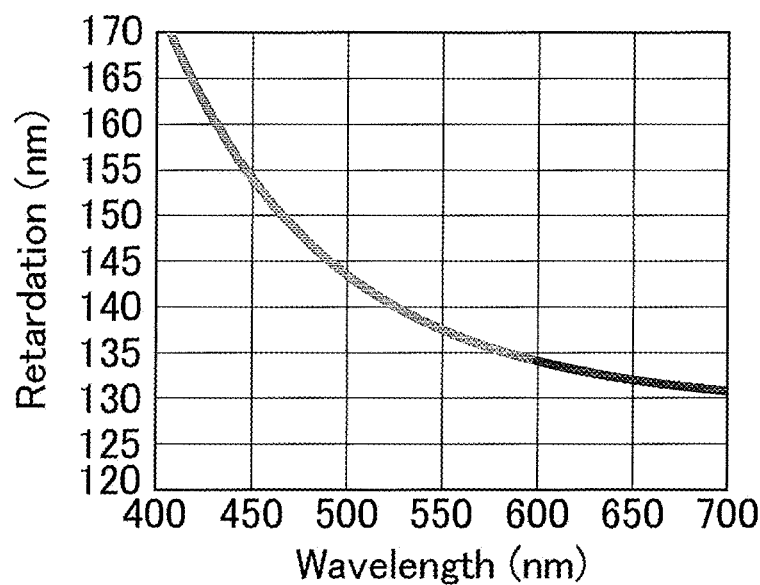
FIG. 49 is a graph showing the retardation wavelength dispersion of an in-cell λ/4 plate in Comparative Example 2.
Figure 50:
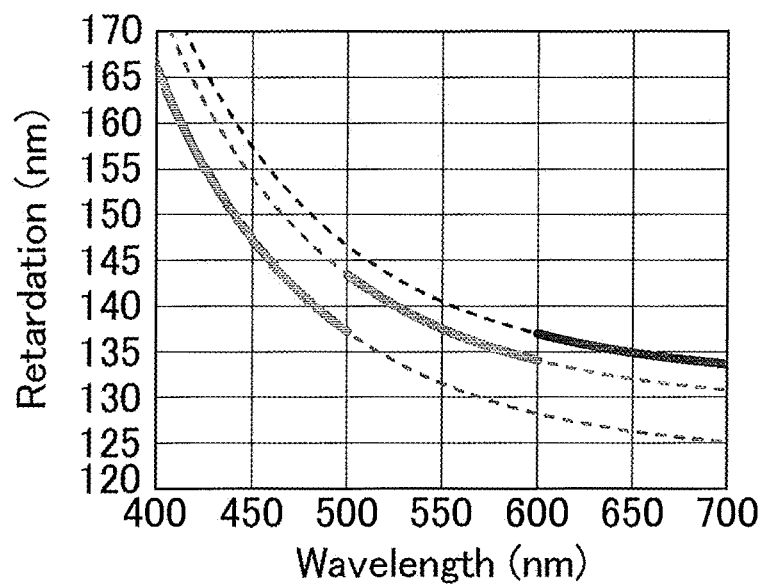
FIG. 50 is a graph showing the retardation wavelength dispersion of an in-cell λ/4 plate in Example 1.
Figure 51:
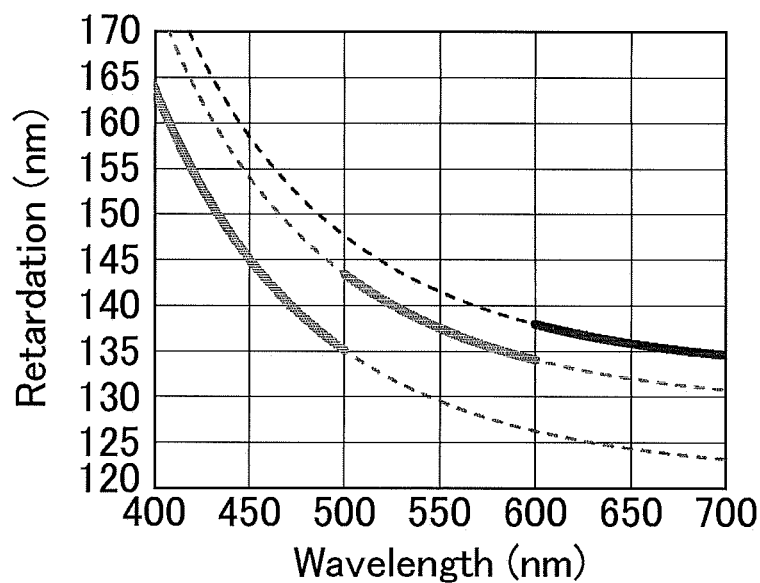
FIG. 51 is a graph showing the retardation wavelength dispersion of an in-cell λ/4 plate in Example 3.
Figure 52:
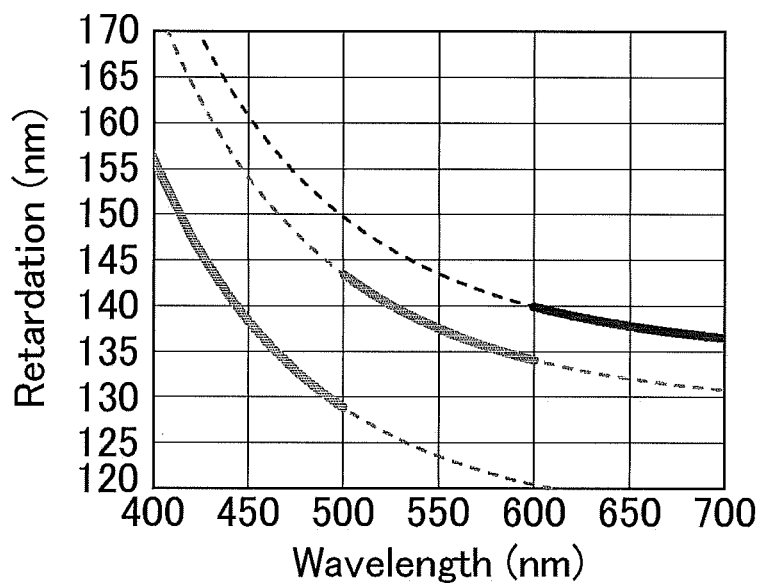
FIG. 52 is a graph showing the retardation wavelength dispersion of an in-cell λ/4 plate in Example 7.
Figure 53:
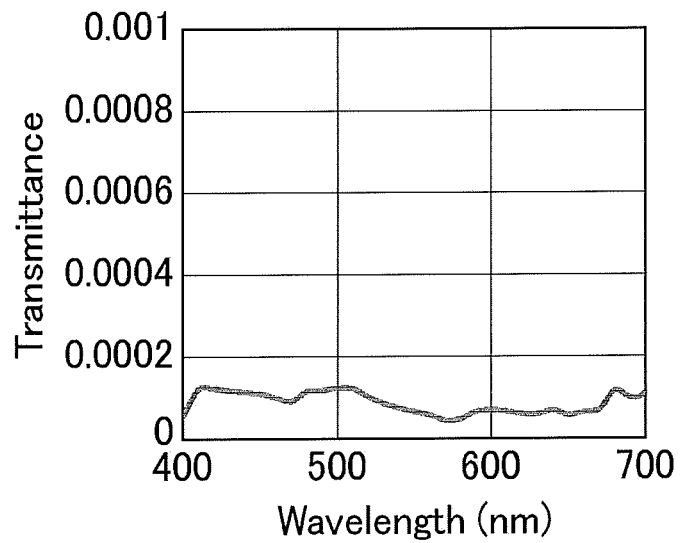
FIG. 53 is a graph showing the transmission spectrum of the black display in a liquid crystal display device of Comparative Example 1.
Figure 54:
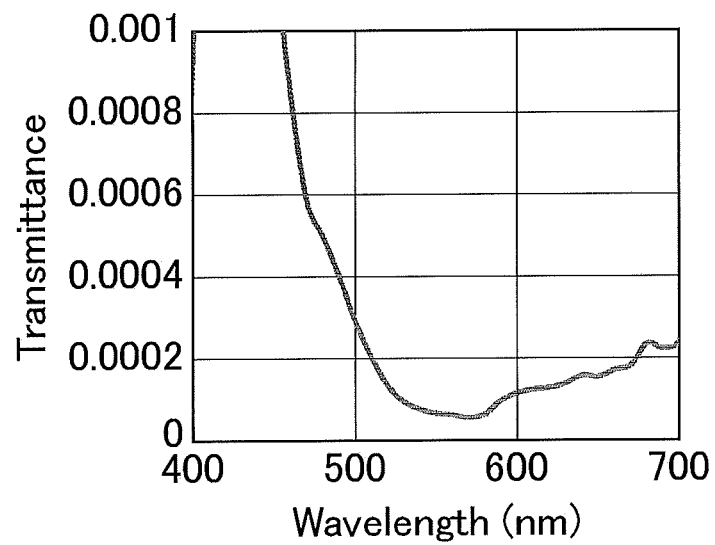
FIG. 54 is a graph showing the transmission spectrum of the black display in a liquid crystal display device of Comparative Example 2.
Figure 55:
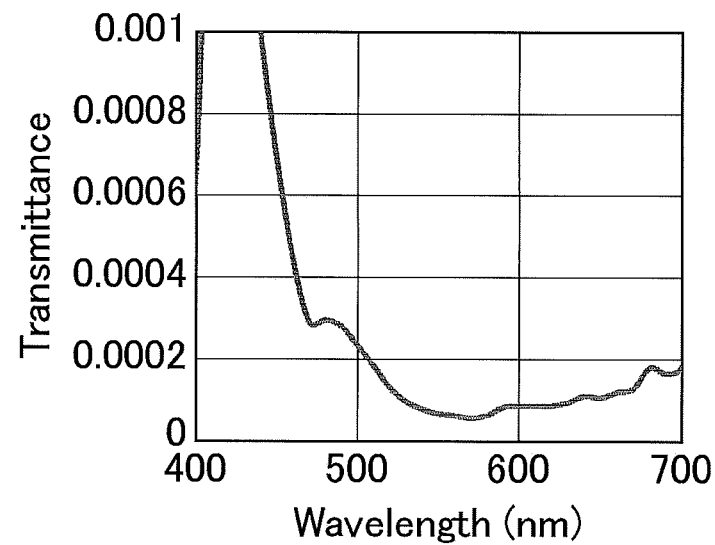
FIG. 55 is a graph showing the transmission spectrum of the black display in a liquid crystal display device of Comparative Example 3.
Figure 56:
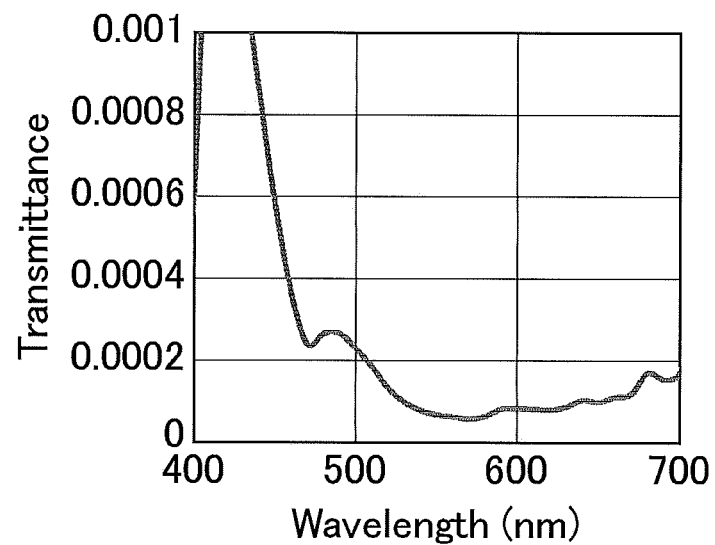
FIG. 56 is a graph showing the transmission spectrum of the black display in a liquid crystal display device of Comparative Example 4.
Figure 57:
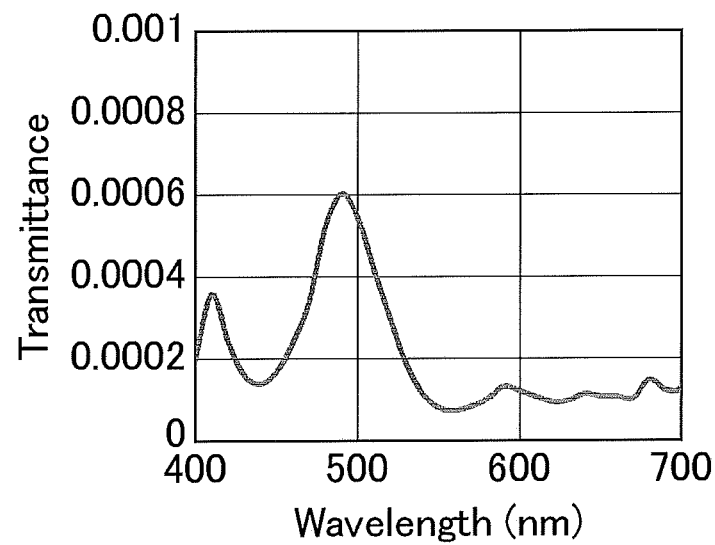
FIG. 57 is a graph showing the transmission spectrum of the black display in a liquid crystal display device of Comparative Example 5.
Figure 58:
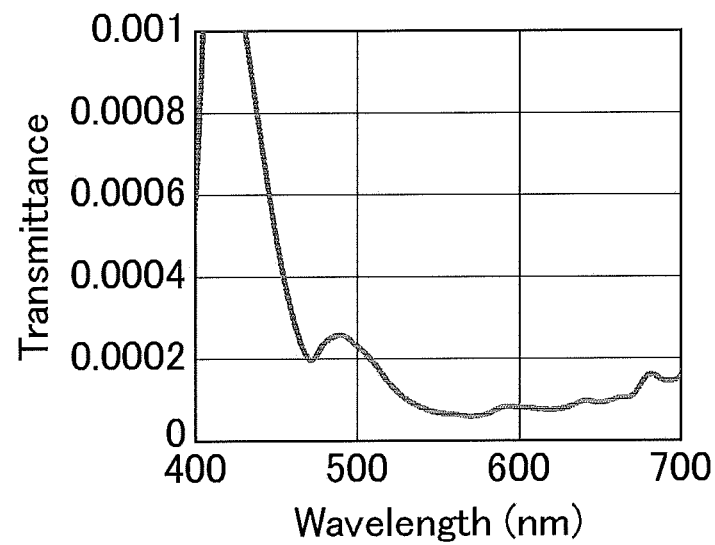
FIG. 58 is a graph showing the transmission spectrum of the black display in a liquid crystal display device of Example 1.
Figure 59:
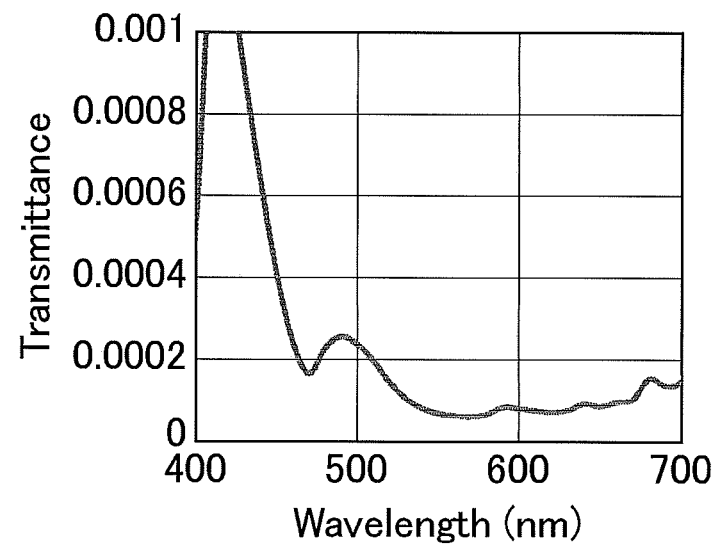
FIG. 59 is a graph showing the transmission spectrum of the black display in a liquid crystal display device of Example 2.
Figure 60:
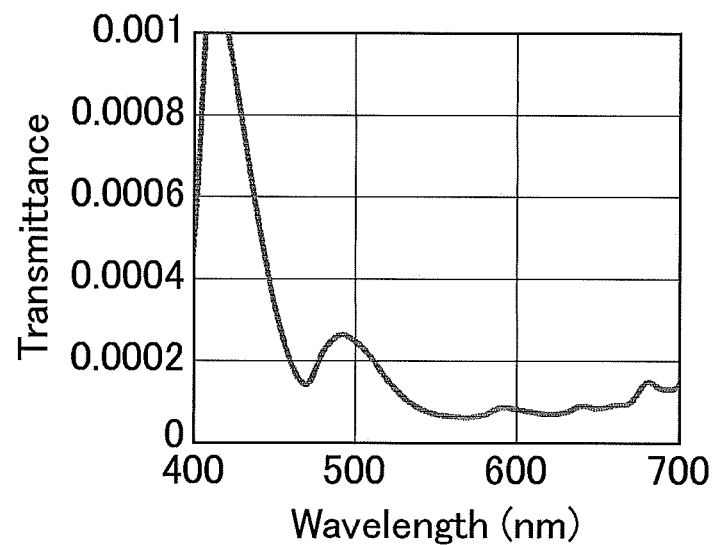
FIG. 60 is a graph showing the transmission spectrum of the black display in a liquid crystal display device of Example 3.
Figure 61:
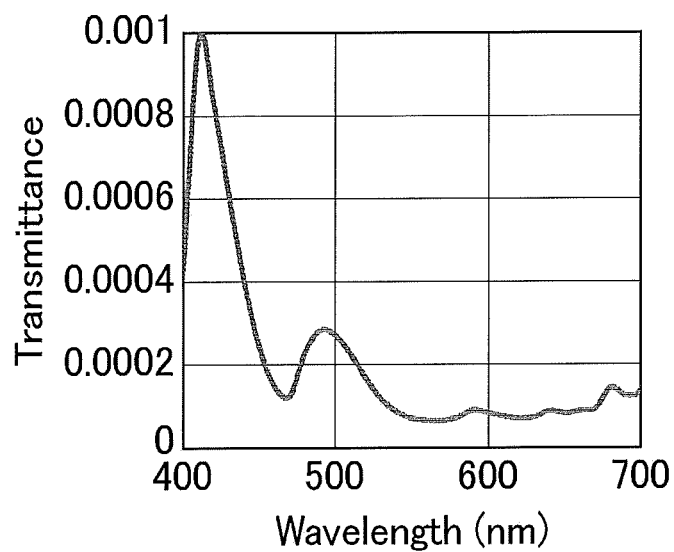
FIG. 61 is a graph showing the transmission spectrum of the black display in a liquid crystal display device of Example 4.
Figure 62:
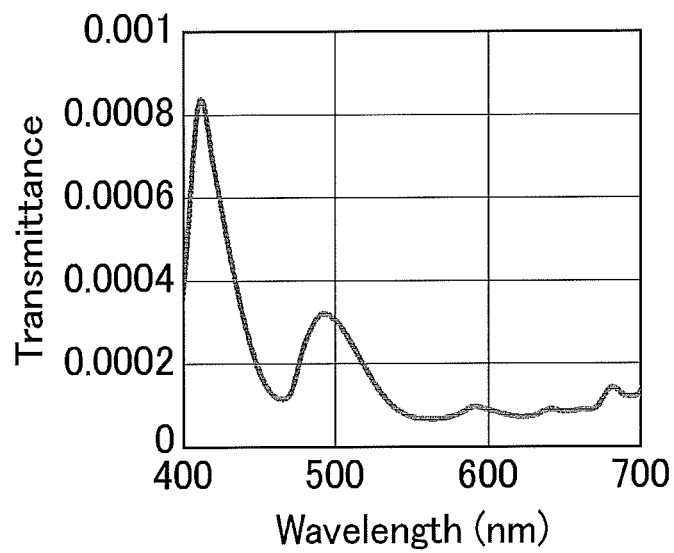
FIG. 62 is a graph showing the transmission spectrum of the black display in a liquid crystal display device of Example 5.
Figure 63:
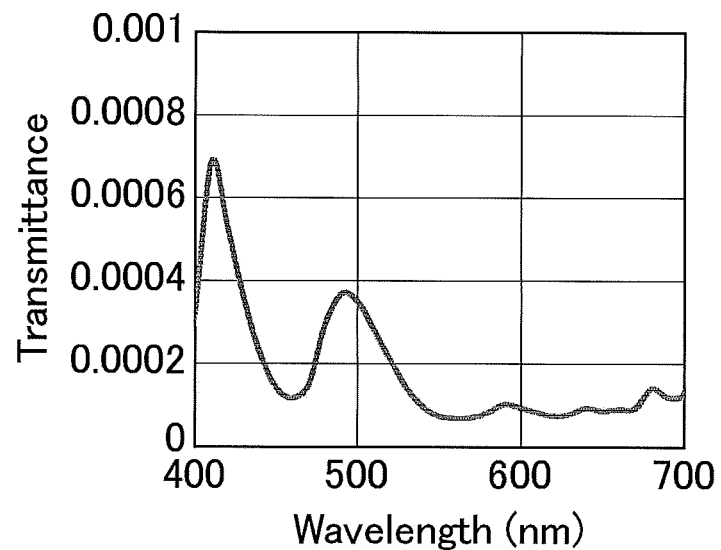
FIG. 63 is a graph showing the transmission spectrum of the black display in a liquid crystal display device of Example 6.
Figure 64:
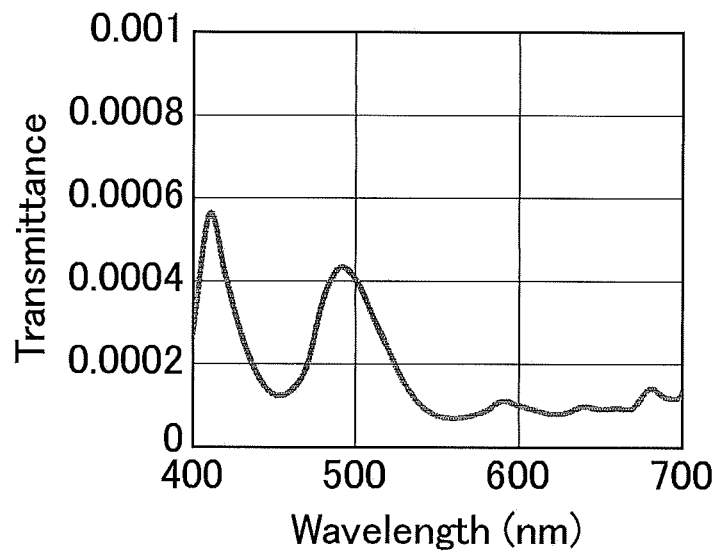
FIG. 64 is a graph showing the transmission spectrum of the black display in a liquid crystal display device of Example 7.
Figure 65:
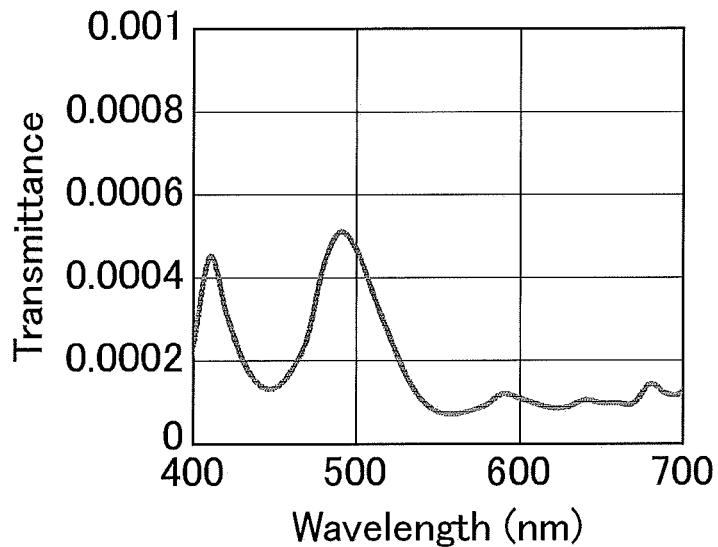
FIG. 65 is a graph showing the transmission spectrum of the black display in a liquid crystal display device of Example 8.

The liquid crystal display devices of Comparative Example 2 and Examples 1, 3, and 7 were selected as having the representative structures, and the retardation wavelength dispersions of the in-cell λ/4 plates 32 therein are shown in FIGS. 49 to 52. FIG. 49 is a graph showing the retardation wavelength dispersion of the in-cell λ/4 plate 32 in Comparative Example 2. FIG. 50 is a graph showing the retardation wavelength dispersion of the in-cell λ/4 plate 32 in Example 1. FIG. 51 is a graph showing the retardation wavelength dispersion of the in-cell λ/4 plate 32 in Example 3. FIG. 52 is a graph showing the retardation wavelength dispersion of the in-cell λ/4 plate 32 in Example 7.

Based on the structures in Comparative Examples 1 to 5 and Examples 1 to 8, the transmission spectra during the black display are shown in FIGS. 53 to 65. FIGS. 53 to 57 show the transmission spectra of the black display in the liquid crystal display devices of Comparative Examples 1 to 5, respectively. FIGS. 58 to 65 show the transmission spectra of the black display in the liquid crystal display devices of Examples 1 to 8, respectively.

(Subjective Evaluation)

The liquid crystal display devices of Comparative Examples 1 to 5 and Examples 1 to 8 were actually experimentally produced and subjected to the subjective evaluation test, with 15 nonprofessionals in their 20 s to 50s selected as the subjects. The subjects were asked to intuitively evaluate the devices on the items of "light leakage" and "coloring" and rate the devices for these items on a scale of 1 to 10 (10=good, 1=poor). The items with an average score of the 15 subjects of lower than 3 were marked as C, those with an average score of 3 to lower than 7 as B, and those with an average score of 7 or higher as A. The obtained results are shown in Table 3.

(Conclusion of the Evaluation)

The liquid crystal display device of Comparative Example 1 had good black display performance with reduced light leakage and reduced coloring, but had poor heat resistance since the out-cell λ/4 plate 31 was formed from a reactive liquid crystal polymer. In contrast, the liquid crystal display devices of Comparative Examples 2 to 5 and Examples 1 to 8 had good heat resistance since the out-cell λ/4 plate 31 was produced using a COP film.

The liquid crystal display device of Comparative Example 2 showed a large amount of light leakage and bluish coloring since the retardation wavelength dispersion of the in-cell λ/4 plate 32 and the retardation wavelength dispersion of the out-cell λ/4 plate 31 did not match each other. The liquid crystal display devices of Comparative Examples 3 and 4 showed insufficient reduction of coloring since the result of Rin(450)−Rout(450) was 10.0 nm or greater. The liquid crystal display device of Comparative Example 5 failed to reduce light leakage since the result of Rin(450)−Rout(450) was −1.0 nm or smaller. In contrast, the liquid crystal display devices of Examples 1 to 8 achieved favorable black display with light leakage and coloring reduced in a balanced manner since the in-cell λ/4 plate 32 and the out-cell λ/4 plate 31 canceled out each other's retardation at the three dominant wavelengths (650 nm, 550 nm, 450 nm) of the RGB three primary colors.

Embodiment 2

Figure 66:
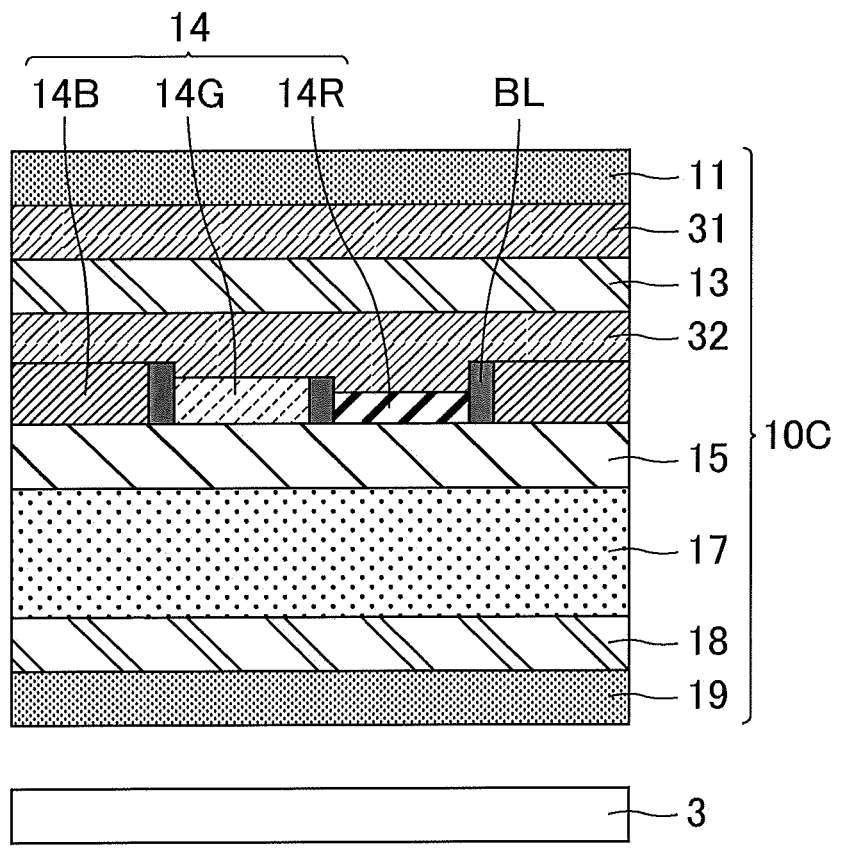
FIG. 66 is a schematic cross-sectional view showing a liquid crystal display device of Embodiment 2.

FIG. 66 is a schematic cross-sectional view showing a liquid crystal display device of Embodiment 2. As shown in FIG. 66, a liquid crystal display panel 10C of the liquid crystal display device of Embodiment 2 sequentially includes, from the viewing surface side to the back surface side, the first linearly polarizing plate 11, the first λ/4 retardation layer 31, the first substrate 13, the second λ/4 retardation layer (in-cell λ/4 plate) 32, the color filter layer 14 and the black matrix BL, the overcoat layer 15, the liquid crystal layer 17, the second substrate 18, and the second linearly polarizing plate 19. In other words, Embodiment 2 is the same as Embodiment 1 except that the in-cell λ/4 plate 32 is disposed between the first substrate 13 and the color filter layer 14.

No transparent electrode is necessary on the first substrate 13 side in the horizontal electric field liquid crystal mode such as the IPS or FFS mode for the purpose of driving the liquid crystals. Yet, in order to prevent defects due to charging, a transparent electrode (not shown) is often disposed on the viewing surface side of the first substrate 13. This transparent electrode is sometimes called a back surface ITO. Also, a touch panel sensor may be disposed on the viewing surface side of the first substrate 13.

The liquid crystal display device of Embodiment 2 cannot reduce reflection on the color filter layer 14 as external light is converted back to linearly polarized light when it is incident on the color filter layer 14. Still, the device can reduce reflection on the transparent electrode (ITO) on the viewing surface side of the first substrate 13. The liquid crystal display device of Embodiment 1, including the in-cell λ/4 plate 32 between the color filter layer 14 and the liquid crystal layer 17, can reduce both reflection on the color filter layer 14 and reflection on the transparent electrode on the viewing surface side of the first substrate 13.

Embodiment 3

Figure 67:
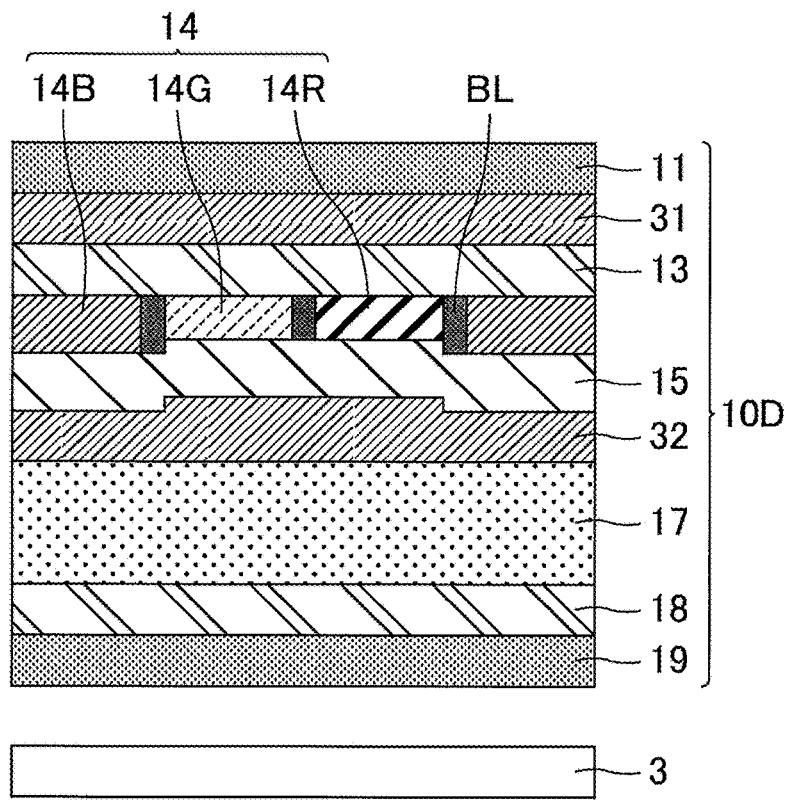
FIG. 67 is a schematic cross-sectional view showing a liquid crystal display device of Embodiment 3.

FIG. 67 is a schematic cross-sectional view showing a liquid crystal display device of Embodiment 3. A liquid crystal display panel 10D in Embodiment 3 is the same as the liquid crystal display panel 10A in Embodiment 1 in that the in-cell λ/4 plate 32 has a smaller thickness in the regions overlapping the blue color filters 14B than in the regions overlapping the green color filters 14G and the out-cell λ/4 plate 31 and the in-cell λ/4 plate 32 provide retardations adjusted to satisfy the above formula (1) in the regions overlapping the blue color filters 14B. As shown in FIG. 67, the liquid crystal display panel 10D in Embodiment 3 is different from the liquid crystal display panel 10A in Embodiment 1 in that the thickness of the regions of the in-cell λ/4 plate 32 overlapping the red color filters 14R is not greater than the thickness of the regions of the in-cell λ/4 plate 32 overlapping the green color filters, and the out-cell λ/4 plate 31 and the in-cell λ/4 plate 32 provide retardations not adjusted to satisfy the above formula (2) in the regions overlapping the red color filters 14R.

The liquid crystal display device of Embodiment 3 can effectively prevent bluish coloring due to light leakage during the black display on the display surface of the liquid crystal display device since it sufficiently reduces the difference in retardation between the in-cell λ/4 plate 32 and the out-cell λ/4 plate 31 in the blue wavelength range where the difference in retardation wavelength dispersion between the in-cell λ/4 plate 32 and the out-cell λ/4 plate 31 is likely to be noticeable.

Embodiment 4

Figure 68:
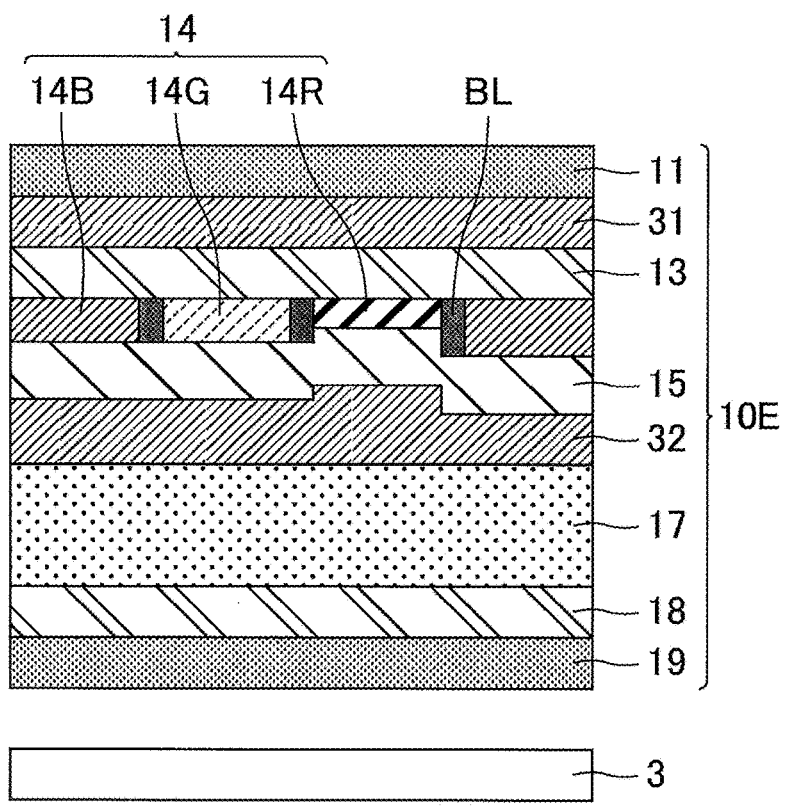
FIG. 68 is a schematic cross-sectional view showing a liquid crystal display device of Embodiment 4.

FIG. 68 is a schematic cross-sectional view showing a liquid crystal display device of Embodiment 4. As shown in FIG. 68, a liquid crystal display panel 10E in Embodiment 4 is different from the liquid crystal display panel 10A in Embodiment 1 in that the thickness of the regions of the in-cell λ/4 plate 32 overlapping the blue color filters 14B is not smaller than the thickness of the regions of the in-cell λ/4 plate 32 overlapping the green color filters 14G, and the out-cell λ/4 plate 31 and the in-cell λ/4 plate 32 provide retardations not adjusted to satisfy the above formula (1) in the regions overlapping the blue color filters 14B. The liquid crystal display panel 10E of Embodiment 4 is the same as the liquid crystal display panel 10A in Embodiment 1 in that the in-cell λ/4 plate 32 had a greater thickness in the regions overlapping the red color filters 14R than in the regions overlapping the green color filters, and the out-cell λ/4 plate 31 and the in-cell λ/4 plate 32 provide retardations adjusted to satisfy the above formula (2) in the regions overlapping the red color filters 14R.

The liquid crystal display device of Embodiment 4 can prevent light leakage during the black display on the display surface of the liquid crystal display device since it sufficiently reduces the difference in retardation between the in-cell λ/4 plate 32 and the out-cell λ/4 plate 31 in the red wavelength range.

[Additional Remarks]

One aspect of the present invention is directed to a liquid crystal display panel (first liquid crystal display panel) including, sequentially from a viewing surface side to a back surface side: a first linearly polarizing plate; a first λ/4 retardation layer whose in-plane slow axis extends in a first direction; a first substrate; a color filter layer including a red color filter, a green color filter, and a blue color filter arranged in a plane; a liquid crystal layer containing liquid crystals horizontally aligned with no voltage applied; a pair of electrodes configured to generate a horizontal electric field in the liquid crystal layer upon voltage application; a second substrate; a second linearly polarizing plate; and a second λ/4 retardation layer that is formed from a different material from the first λ/4 retardation layer and whose in-plane slow axis extends in a second direction perpendicular to the first direction, the second λ/4 retardation layer being disposed between the first substrate and the color filter layer or between the color filter layer and the liquid crystal layer, the second λ/4 retardation layer having a smaller thickness in a region overlapping the blue color filter than in a region overlapping the green color filter, the first λ/4 retardation layer providing a retardation Rout(λ) to light having a wavelength of λ nm, the second λ/4 retardation layer providing a retardation Rin(λ) to light having a wavelength of λ nm, the retardation Rout(λ) and the retardation Rin(λ) satisfying the following formula (1) in the region overlapping the blue color filter, $$-1.0 \text{ nm} < Rin(450) - Rout(450) < 10.0 \text{ nm} \quad (1).$$

In the first liquid crystal display panel, preferably, the second λ/4 retardation layer has a greater thickness in a region overlapping the red color filter than in a region overlapping the green color filter, and the retardation Rout(λ) and the retardation Rin(λ) satisfy the following formula (2) in the region overlapping the red color filter, $$-3.0 \text{ nm} < Rin(650) - Rout(650) < 1.0 \text{ nm} \quad (2).$$

In the first liquid crystal display panel, preferably, the first λ/4 retardation layer is formed from a flat wavelength dispersion material that has a birefringence Δn(λ) for light having a wavelength of λ nm and satisfies the following formulas (3) and (4). The flat wavelength dispersion material may be a cycloolefin polymer.

$$0.99 < \Delta n(450 \text{ nm})/\Delta n(550 \text{ nm}) < 1.03 \quad (3)$$

$$0.98 < \Delta n(650 \text{ nm})/\Delta n(550 \text{ nm}) < 1.01 \quad (4)$$

In the first liquid crystal display panel, the second λ/4 retardation layer may be formed from a normal wavelength dispersion material that has a birefringence Δn(λ) for light having a wavelength of λ nm, a ratio Δn(450 nm)/Δn(550 nm) of 1.03 or higher, and a ratio Δn(650 nm)/Δn(550 nm) of 0.98 or lower. The normal wavelength dispersion material may be a cured product of a reactive liquid crystal polymer.

In the first liquid crystal display panel, a region of the blue color filter overlapping the second λ/4 retardation layer may have a greater thickness than a region of the green color filter overlapping the second λ/4 retardation layer.

In the first liquid crystal display panel, a region of the red color filter overlapping the second λ/4 retardation layer may have a smaller thickness than a region of the green color filter overlapping the second λ/4 retardation layer.

In the first liquid crystal display panel, the color filter layer may include a colorless spacer between the second λ/4 retardation layer and the blue color filter.

Another aspect of the present invention is directed to a liquid crystal display panel (second liquid crystal display panel) including, sequentially from a viewing surface side to a back surface side: a first linearly polarizing plate; a first λ/4 retardation layer whose in-plane slow axis extends in a first direction; a first substrate; a color filter layer including a red color filter, a green color filter, and a blue color filter arranged in a plane; a liquid crystal layer containing liquid crystals horizontally aligned with no voltage applied; a pair of electrodes configured to generate a horizontal electric field in the liquid crystal layer upon voltage application; a second substrate; a second linearly polarizing plate; and a second λ/4 retardation layer that is formed from a different material from the first λ/4 retardation layer and whose in-plane slow axis extends in a second direction perpendicular to the first direction, the second λ/4 retardation layer being disposed between the first substrate and the color filter layer or between the color filter layer and the liquid crystal layer, the second λ/4 retardation layer having a greater thickness in a region overlapping the red color filter than in a region overlapping the green color filter, the first λ/4 retardation layer providing a retardation Rout(λ) to light having a wavelength of λ nm, the second λ/4 retardation layer providing a retardation Rin(λ) to light having a wavelength of λ nm, the retardation Rout(λ) and the retardation Rin(λ) satisfying the following formula (2) in the region overlapping the red color filter, $$-3.0 \text{ nm} < Rin(650) - Rout(650) < 1.0 \text{ nm} \quad (2).$$

In the second liquid crystal display panel, preferably, the second λ/4 retardation layer has a smaller thickness in a region overlapping the blue color filter than in a region overlapping the green color filter, and the retardation Rout(λ) and the retardation Rin(λ) satisfy the following formula (1) in the region overlapping the blue color filter, $$-1.0 \text{ nm} < Rin(450) - Rout(450) < 10.0 \text{ nm} \quad (1).$$

In the second liquid crystal display panel, the first λ/4 retardation layer may be formed from a flat wavelength dispersion material that has a birefringence Δn(λ) for light having a wavelength of λ nm and satisfies the following formulas (3) and (4). The flat wavelength dispersion material may be a cycloolefin polymer.

$$0.99 < \Delta n(450 \text{ nm})/\Delta n(550 \text{ nm}) < 1.03 \quad (3)$$

$$0.98 < \Delta n(650 \text{ nm})/\Delta n(550 \text{ nm}) < 1.01 \quad (4)$$

In the second liquid crystal display panel, the second λ/4 retardation layer may be formed from a normal wavelength dispersion material that has a birefringence Δn(λ) for light having a wavelength of λ nm, a ratio Δn(450 nm)/Δn(550 nm) of 1.03 or higher, and a ratio Δn(650 nm)/Δn(550 nm) of 0.98 or lower. The normal wavelength dispersion material may be a cured product of a reactive liquid crystal polymer.

In the second liquid crystal display panel, a region of the blue color filter overlapping the second λ/4 retardation layer may have a greater thickness than a region of the green color filter overlapping the second λ/4 retardation layer.

In the second liquid crystal display panel, a region of the red color filter overlapping the second λ/4 retardation layer may have a smaller thickness than a region of the green color filter overlapping the second λ/4 retardation layer.

In the second liquid crystal display panel, the color filter layer may include a colorless spacer between the second λ/4 retardation layer and the blue color filter.

Yet another aspect of the present invention is directed to a liquid crystal display device including the first liquid crystal display panel or the second liquid crystal display panel.

REFERENCE SIGNS LIST

3: backlight
10A, 10B, 10C, 10D, 10E: liquid crystal display panel
11: first linearly polarizing plate
13: first substrate
14: color filter layer
14B: blue color filter
14G: green color filter
14R: red color filter
14W: colorless spacer
15: overcoat layer
17: liquid crystal layer
18: second substrate
19: second linearly polarizing plate
21: supporting substrate
22: common electrode (planar electrode)
23: insulating film
24: pixel electrode (comb electrode)
31: first λ/4 retardation layer (out-cell λ/4 plate)
32: second λ/4 retardation layer (in-cell λ/4 plate)
BL: black matrix

The invention claimed is:

1. A liquid crystal display panel comprising, sequentially from a viewing surface side to a back surface side:
   a first linearly polarizing plate;
   a first λ/4 retardation layer whose in-plane slow axis extends in a first direction;
   a first substrate;
   a color filter layer including a red color filter, a green color filter, and a blue color filter arranged in a plane;
   a liquid crystal layer containing liquid crystals horizontally aligned with no voltage applied;
   a pair of electrodes configured to generate a horizontal electric field in the liquid crystal layer upon voltage application;
   a second substrate;
   a second linearly polarizing plate; and
   a second λ/4 retardation layer that is formed from a different material from the first λ/4 retardation layer and whose in-plane slow axis extends in a second direction perpendicular to the first direction, the second λ/4 retardation layer being disposed between the first substrate and the color filter layer or between the color filter layer and the liquid crystal layer,
   the second λ/4 retardation layer having a smaller thickness in a region overlapping the blue color filter than in a region overlapping the green color filter,
   the first λ/4 retardation layer providing a retardation Rout(λ) to light having a wavelength of λ nm,
   the second λ/4 retardation layer providing a retardation Rin(λ) to light having a wavelength of λ nm,
   the retardation Rout(λ) and the retardation Rin(λ) satisfying the following formula (1) in the region overlapping the blue color filter, $$-1.0 \text{ nm} < Rin(450) - Rout(450) < 10.0 \text{ nm} \quad (1).$$

2. The liquid crystal display panel according to claim 1, wherein the second λ/4 retardation layer has a greater thickness in a region overlapping the red color filter than in a region overlapping the green color filter, and the retardation Rout(λ) and the retardation Rin(λ) satisfy the following formula (2) in the region overlapping the red color filter, $$-3.0 \text{ nm} < Rin(650) - Rout(650) < 1.0 \text{ nm} \quad (2).$$

3. The liquid crystal display panel according to claim 1, wherein the first λ/4 retardation layer is formed from a flat wavelength dispersion material that has a birefringence λn(λ) for light having a wavelength of λ nm and satisfies the following formulas (3) and (4):

$$0.99 < \Delta n(450\text{ nm})/\Delta n(550\text{ nm}) < 1.03 \qquad (3)$$

$$0.98 < \Delta n(650\text{ nm})/\Delta n(550\text{ nm}) < 1.01 \qquad (4).$$

4. The liquid crystal display panel according to claim 3, wherein the flat wavelength dispersion material is a cycloolefin polymer.

5. The liquid crystal display panel according to claim 1, wherein the second λ/4 retardation layer is formed from a normal wavelength dispersion material that has a birefringence Δn(2) for light having a wavelength of λ nm, a ratio Δn(450 nm)/Δn(550 nm) of 1.03 or higher, and a ratio Δn(650 nm)/Δn(550 nm) of 0.98 or lower.

6. The liquid crystal display panel according to claim 5, wherein the normal wavelength dispersion material is a cured product of a reactive liquid crystal polymer.

7. The liquid crystal display panel according to claim 1, wherein a region of the blue color filter overlapping the second λ/4 retardation layer has a greater thickness than a region of the green color filter overlapping the second λ/4 retardation layer.

8. The liquid crystal display panel according to claim 1, wherein a region of the red color filter overlapping the second λ/4 retardation layer has a smaller thickness than a region of the green color filter overlapping the second λ/4 retardation layer.

9. The liquid crystal display panel according to claim 1, wherein the color filter layer includes a colorless spacer between the second λ/4 retardation layer and the blue color filter.

10. A liquid crystal display device comprising the liquid crystal display panel according to claim 1.

11. A liquid crystal display panel comprising, sequentially from a viewing surface side to a back surface side:

a first linearly polarizing plate;

a first λ/4 retardation layer whose in-plane slow axis extends in a first direction;

a first substrate;

a color filter layer including a red color filter, a green color filter, and a blue color filter arranged in a plane;

a liquid crystal layer containing liquid crystals horizontally aligned with no voltage applied;

a pair of electrodes configured to generate a horizontal electric field in the liquid crystal layer upon voltage application;

a second substrate;

a second linearly polarizing plate; and a second λ/4 retardation layer that is formed from a different material from the first λ/4 retardation layer and whose in-plane slow axis extends in a second direction perpendicular to the first direction, the second λ/4 retardation layer being disposed between the first substrate and the color filter layer or between the color filter layer and the liquid crystal layer, the second λ/4 retardation layer having a greater thickness in a region overlapping the red color filter than in a region overlapping the green color filter, the first λ/4 retardation layer providing a retardation Rout(λ) to light having a wavelength of λ nm, the second λ/4 retardation layer providing a retardation Rin(λ) to light having a wavelength of λ nm, the retardation Rout(λ) and the retardation Rin(λ) satisfying the following formula (2) in the region overlapping the red color filter, $$-3.0\text{ nm} < R\text{in}(650) - R\text{out}(650) < 1.0\text{ nm} \qquad (2).$$

* * * * *